(12) United States Patent
Wang et al.

(10) Patent No.: US 12,722,278 B2
(45) Date of Patent: Sep. 1, 2026

(54) MOBILE ROBOT WITH IMPROVED ACCURACY AND GENERATING THREE-DIMENSIONAL DEPTH MAP

(71) Applicant: PixArt Imaging Inc., Hsin-Chu County (TW)

(72) Inventors: Guo-Zhen Wang, Hsin-Chu County (TW); Tse-En Peng, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 522 days.

(21) Appl. No.: 18/219,921

(22) Filed: Jul. 10, 2023

(65) Prior Publication Data

US 2023/0347502 A1 Nov. 2, 2023

Related U.S. Application Data

(60) Continuation-in-part of application No. 18/198,818, filed on May 17, 2023, now Pat. No. 12,172,301, and a continuation-in-part of application No. 17/533,585, filed on Nov. 23, 2021, now Pat. No. 12,566,269, which is a continuation-in-part of application No. 17/342,044, filed on Jun. 8, 2021, now Pat. No. 11,821,985, application No. 18/219,921 is a continuation-in-part of application No. 17/342,044, filed on Jun. 8, 2021, now Pat. No. 11,821,985, which is a continuation-in-part of application No.

(Continued)

(51) Int. Cl.

*B25J 9/00* (2006.01)
*B25J 9/16* (2006.01)
*G06T 7/70* (2017.01)
*B25J 11/00* (2006.01)

(52) U.S. Cl.

CPC .......... *B25J 9/0003* (2013.01); *B25J 9/1676* (2013.01); *G06T 7/70* (2017.01); *B25J 11/0085* (2013.01)

(58) Field of Classification Search

CPC .... B25J 9/0003; B25J 9/1676; B25J 11/0085; A47L 9/2826; A47L 9/2852; A47L 9/2857; A47L 9/2805; A47L 2201/04; A47L 2201/06; G06T 2207/10024; G06T 2207/10048; G06T 2207/20084; G06T 2207/30252; G06T 7/70; G06T 7/55; G05D 2105/10; G05D 2107/40; G05D 2109/10; G05D 2111/14; G05D 1/242; G05D 1/2465

See application file for complete search history.

(56) References Cited

U.S. PATENT DOCUMENTS

| | | | |
|---|---|---|---|
| 10,611,023 | B2 | 4/2020 | Fong et al. |
| 2004/0212805 | A1 | 10/2004 | Wang et al. |

(Continued)

FOREIGN PATENT DOCUMENTS

| | | | |
|---|---|---|---|
| CN | 103034342 | A | 4/2013 |
| CN | 105988596 | A | 10/2016 |
| CN | 111035321 | A | 4/2020 |

*Primary Examiner* — Nhi Q Bui

(74) *Attorney, Agent, or Firm* — WPAT, PC

(57) ABSTRACT

There is provided a mobile robot that performs the de-flickering and different auto exposures in a pixel array in the range estimation to be adaptable to different operating scenarios, and constructs a three-dimensional depth map to lower the cost.

20 Claims, 17 Drawing Sheets

Related U.S. Application Data

17/185,263, filed on Feb. 25, 2021, now Pat. No. 11,307,308, said application No. 17/533,585 is a continuation-in-part of application No. 17/064,776, filed on Oct. 7, 2020, now Pat. No. 11,752,635, application No. 18/219,921 is a continuation-in-part of application No. 17/064,776, filed on Oct. 7, 2020, now Pat. No. 11,752,635, said application No. 18/198,818 is a continuation of application No. 16/929,232, filed on Jul. 15, 2020, now Pat. No. 11,691,264, said application No. 17/342,044 is a continuation-in-part of application No. 16/929,232, filed on Jul. 15, 2020, now Pat. No. 11,691,264, said application No. 17/064,776 is a continuation-in-part of application No. 16/929,232, filed on Jul. 15, 2020, now Pat. No. 11,691,264, said application No. 17/185,263 is a division of application No. 16/800, 187, filed on Feb. 25, 2020, now Pat. No. 10,962,646, said application No. 16/929,232 is a continuation-in-part of application No. 16/425,955, filed on May 30, 2019, now Pat. No. 11,510,539, said application No. 16/800,187 is a continuation of application No. 15/841,376, filed on Dec. 14, 2017, now Pat. No. 10,627,518, said application No. 16/425,955 is a continuation-in-part of application No. 15/841,376, filed on Dec. 14, 2017, now Pat. No. 10,627,518.

(60) Provisional application No. 62/514,349, filed on Jun. 2, 2017.

(56) References Cited

U.S. PATENT DOCUMENTS

| | | | | |
|---|---|---|---|---|
| 2008/0018602 | A1 | 1/2008 | Cheng et al. | |
| 2009/0146044 | A1 | 6/2009 | Chen et al. | |
| 2011/0304840 | A1 | 12/2011 | Hsu | |
| 2012/0019677 | A1 | 1/2012 | Wong et al. | |
| 2013/0138247 | A1 | 5/2013 | Gutmann et al. | |
| 2015/0226553 | A1* | 8/2015 | Fuchikami | G01B 11/026 348/135 |
| 2016/0034737 | A1 | 2/2016 | Goren | |
| 2016/0094797 | A1* | 3/2016 | Yoon | H04N 23/73 348/294 |
| 2016/0205306 | A1 | 7/2016 | Wang | |
| 2016/0288330 | A1 | 10/2016 | Konolige | |
| 2017/0371856 | A1 | 12/2017 | Can et al. | |
| 2018/0196512 | A1 | 7/2018 | Kim et al. | |
| 2018/0210445 | A1 | 7/2018 | Choi et al. | |
| 2018/0270445 | A1 | 9/2018 | Khandelwal et al. | |
| 2019/0007629 | A1* | 1/2019 | Lin | H04N 23/71 |
| 2019/0113606 | A1 | 4/2019 | Mathy et al. | |
| 2019/0320867 | A1 | 10/2019 | Noh et al. | |
| 2020/0025561 | A1* | 1/2020 | Konolige | G06T 1/0014 |
| 2021/0084205 | A1* | 3/2021 | Guérin | H04N 23/45 |
| 2024/0054610 | A1 | 2/2024 | Takahashi | |

* cited by examiner

MOBILE ROBOT WITH IMPROVED ACCURACY AND GENERATING THREE-DIMENSIONAL DEPTH MAP

RELATED APPLICATIONS

The present application is a continuation-in-part application of U.S. patent application Ser. No. 18/198,818 filed on May 17, 2023, which is a continuation application of U.S. patent application Ser. No. 16/929,232 filed on Jul. 15, 2020, which is a continuation-in-part application of U.S. patent application Ser. No. 16/425,955 filed on May 30, 2019, which is a continuation-in-part application of U.S. patent application Ser. No. 15/841,376 filed on Dec. 14, 2017, which claims the priority benefit of U.S. Provisional Application Ser. No. 62/514,349, filed on Jun. 2, 2017, the disclosures of which are hereby incorporated by reference herein in their entirety.

The present application is also a continuation-in-part application of U.S. patent application Ser. No. 17/064,776 filed on Oct. 7, 2020, which is a continuation-in-part application of U.S. patent application Ser. No. 16/929,232 filed on Jul. 15, 2020, which is a continuation-in-part application of U.S. patent application Ser. No. 16/425,955 filed on May 30, 2019, which is a continuation-in-part application of U.S. patent application Ser. No. 15/841,376 filed on Dec. 14, 2017, which claims the priority benefit of U.S. Provisional Application Ser. No. 62/514,349, filed on Jun. 2, 2017, the disclosures of which are hereby incorporated by reference herein in their entirety.

The present application is also a continuation-in-part application of U.S. patent application Ser. No. 17/342,044 filed on Jun. 8, 2021, which is a continuation-in-part application of U.S. patent application Ser. No. 16/929,232 filed on Jul. 15, 2020, which is a continuation-in-part application of U.S. patent application Ser. No. 16/425,955 filed on May 30, 2019, which is a continuation-in-part application of U.S. patent application Ser. No. 15/841,376 filed on Dec. 14, 2017, which claims the priority benefit of U.S. Provisional Application Ser. No. 62/514,349, filed on Jun. 2, 2017, the disclosures of which are hereby incorporated by reference herein in their entirety.

The present application is also a continuation-in-part application of U.S. patent application Ser. No. 17/533,585 filed on Nov. 23, 2021, which is a continuation-in-part application of U.S. patent application Ser. No. 17/064,776 filed on Oct. 7, 2020, which is a continuation-in-part application of U.S. patent application Ser. No. 16/929,232 filed on Jul. 15, 2020, which is a continuation-in-part application of U.S. patent application Ser. No. 16/425,955 filed on May 30, 2019, which is a continuation-in-part application of U.S. patent application Ser. No. 15/841,376 filed on Dec. 14, 2017, which claims the priority benefit of U.S. Provisional Application Ser. No. 62/514,349, filed on Jun. 2, 2017, the disclosures of which are hereby incorporated by reference herein in their entirety.

The U.S. patent application Ser. No. 17/533,585 is also a continuation-in-part application of U.S. patent application Ser. No. 17/342,044 filed on Jun. 8, 2021, which is a continuation-in-part application of U.S. patent application Ser. No. 16/929,232 filed on Jul. 15, 2020, which is a continuation-in-part application of U.S. patent application Ser. No. 16/425,955 filed on May 30, 2019, which is a continuation-in-part application of U.S. patent application Ser. No. 15/841,376 filed on Dec. 14, 2017, which claims the priority benefit of U.S. Provisional Application Ser. No.

62/514,349, filed on Jun. 2, 2017, the disclosures of which are hereby incorporated by reference herein in their entirety.

The U.S. patent application Ser. No. 17/342,044 is also a continuation-in-part application of U.S. patent application Ser. No. 17/185,263 filed on Feb. 25, 2021, which is a divisional application of U.S. patent application Ser. No. 16/800,187 filed on Feb. 25, 2020, which is a continuation application of U.S. patent application Ser. No. 15/841,376 filed on Dec. 14, 2017, which claims the priority benefit of U.S. Provisional Application Ser. No. 62/514,349, filed on Jun. 2, 2017, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a mobile robot and, more particularly, to a mobile robot that performs the obstacle avoidance, positioning and object recognition according to image frames captured by the same optical sensor corresponding to lighting of different light sources.

2. Description of the Related Art

The smart home is one part of developing a smart city, and a cleaning robot has almost become one standard electronic product in a smart home. Generally, the cleaning robot is arranged with multiple functions to improve the user experience, e.g., including mapping of an operation area, obstacle detection and avoidance during operation. The current cleaning robot is employed with multiple types of sensors to perform these different detecting functions.

For example, the cleaning robot includes a sensor arranged at a top surface thereof to implement the visual simultaneous localization and mapping (VSLAM) by capturing images above the path by which the cleaning robot passes. In addition, the cleaning robot further adopts a front sensor to implement the obstacle detection and avoidance by capturing images in front of a moving direction of the mobile robot.

That is, the conventional cleaning robot needs multiple sensors to perform different detecting functions.

Accordingly, the present disclosure provides a mobile robot that performs the obstacle avoidance, positioning and object recognition according to the image frames captured by the same one optical sensor corresponding to lighting of different light sources.

SUMMARY

The present disclosure provides a mobile robot that performs the obstacle avoidance according to the image frame captured by an optical sensor when a laser diode is emitting light, and performs the visual simultaneous localization and mapping (VSLAM) according to the image frame captured by the optical sensor when a light emitting diode is emitting light.

The present disclosure further provides a mobile robot that determines a region of interest according to the image frame captured by an optical sensor when a laser diode is emitting light, and performs the object recognition in the region of interest of the image frame captured by the optical sensor when a light emitting diode is emitting light to reduce the computation loading and power consumption as well as improve the recognition correctness.

The present disclosure provides a mobile robot including a light source, an optical sensor and a processor. The light source is configured to project a linear light section of infrared light toward a moving direction of the mobile robot. The optical sensor has a plurality of infrared pixels and a plurality of non-infrared pixels, and is configured to capture an image frame toward the moving direction. The processor is embedded with a machine learning algorithm and coupled to the optical sensor, and configured to divide the image frame into a first sub-frame, associated with the plurality of non-infrared pixels, and a second sub-frame, associated with the plurality of infrared pixels, calculate, using the machine learning algorithm, relative depths of obstacles in the first sub-frame, calculate absolute depths of the obstacles in the second sub-frame, and construct a three-dimensional depth map by modifying each of the relative depths using a corresponding absolute depth among the calculated absolute depths.

The present disclosure further provides a mobile robot including a light source, an optical sensor and a processor. The light source is configured to project a longitudinal light section toward a moving direction of the mobile robot, and the light source being turned on and turned off alternatively. The optical sensor is configured to sequentially capture a first dark image frame, a bright image frame and a second dark image frame toward the moving direction. The processor is coupled to the optical sensor, and configured to calculate a first differential image frame between the first dark image frame and the second dark image frame to determine at least one flicker region, calculate a second differential image frame between the bright image frame and one of the first dark image frame and the second dark image frame, and use the at least one flicker region as at least one flicker mask in the second differential image frame.

The present disclosure further provides a mobile robot including a light source, an optical sensor and a processor. The light source is configured to project a longitudinal light section toward a moving direction of the mobile robot. The optical sensor has a pixel array divided into an upper part pixels and a lower part pixels, and the pixel array is configured to capture an image frame toward the moving direction. The processor is coupled to the optical sensor, and configured to control the upper part pixels to perform a first auto exposure, and control the lower part pixels to perform a second auto exposure individual from the first auto exposure.

In the present disclosure, the mobile robot realizes multiple detecting functions by using a single optical sensor incorporating with different light sources activating at different times.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The mobile robot of the present disclosure is to operate using a single optical sensor incorporating with different light sources. The linear light source is used to find an obstacle and measure a distance of the obstacle as a reference for turning a moving direction of the robot. The illumination light source is used to illuminate a front area for the visual simultaneous localization and mapping (VSLAM) and the object recognition.

Figure 1A:
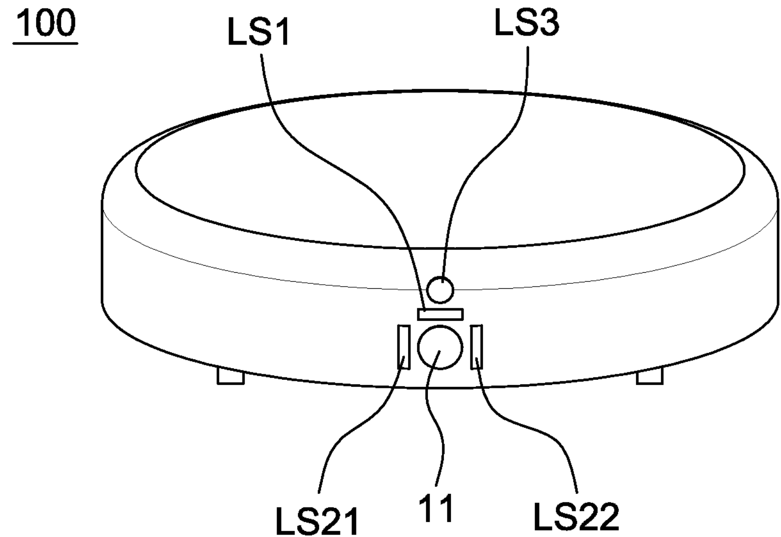
FIG. 1A is a schematic diagram of a mobile robot according to one embodiment of the present disclosure.

Referring to FIG. 1A, it is a schematic diagram of a mobile robot 100 according to one embodiment of the present disclosure. FIG. 1A shows that the mobile robot 100 is a cleaning robot, but the present disclosure is not limited thereto. The mobile robot 100 is any electronic robot that moves according to the imaging result to perform the transportation, communication and guiding.

Figure 1B:
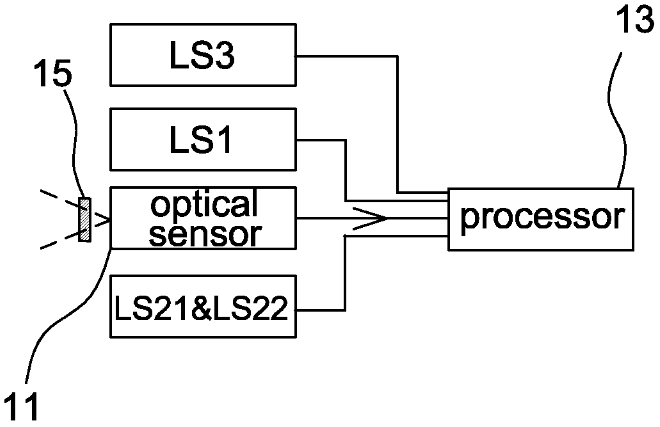
FIG. 1B is a schematic block diagram of elements of a mobile robot according to one embodiment of the present disclosure.

Please referring to FIG. 1B together, it is a schematic block diagram of a mobile robot 100 according to one embodiment of the present disclosure. The mobile robot 100 includes a first light source LS1, second light sources LS21 and LS22, a third light source LS3, an optical sensor 11 and a processor 13. The processor 13 is an application specific integrated circuit (ASIC) or a micro controller unit (MCU) that implements its functions using software, hardware and/or firmware. Although FIG. 1B shows two second light sources, it is only intended to illustrate but not to limit the present disclosure. The mobile robot 100 may include only one second light source.

The first light source LS1 includes, for example, a laser light source and a diffractive optical element. The diffractive optical element causes light emitted by the laser light source to generate a transverse projecting light after passing thereby such that the first light source LS1 projects a transverse light section toward a moving direction. The moving direction is along a side arranging the first light source LS1, the second light sources LS21 and LS22, the third light source LS3 and the optical sensor 11.

The second light sources LS21 and LS22 respectively include, for example, a laser light source and a diffractive optical element. The diffractive optical element causes light emitted by the laser light source to generate a longitudinal projecting light after passing thereby such that the second light sources LS21 and LS22 respectively project a longitudinal light section toward the moving direction.

In the present disclosure, the laser light source is, for example, an infrared laser diode (IR LD).

The third light source LS3 is, for example, an IR light emitting diode (LED), and used to illuminate a front area of the moving direction. An area illuminated by the third light source LS3 is preferably larger than or equal to a field of view of the optical sensor 11. In the present disclosure, when the third light source LS3 is lighted up, the first light source LS1 as well as the second light sources LS21 and LS22 are turned off.

Figure 2:
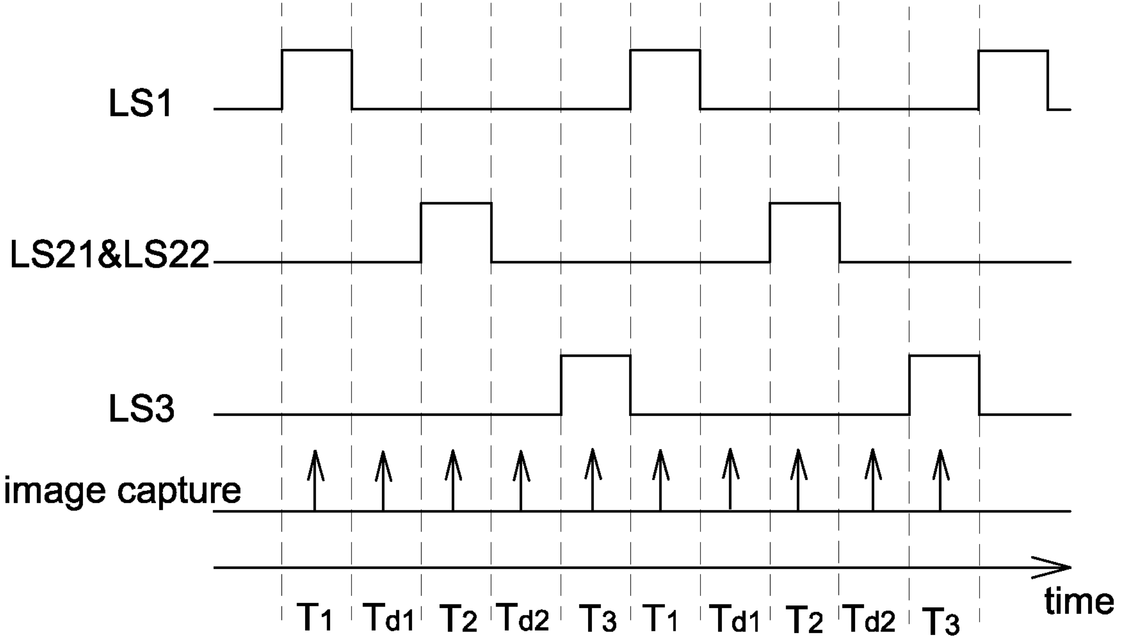
FIG. 2 is an operational timing diagram of a mobile robot according to a first embodiment of the present disclosure.

Please referring to FIG. 2, it is an operational timing diagram of a mobile robot 100 according to a first embodiment of the present disclosure. The first light source LS1 projects a transverse light section toward the moving direction at a first time interval T1. The second light sources LS1 and LS2 respectively project a longitudinal light section toward the moving direction at a second time interval T2. The third light source LS3 illuminates a front area of the moving direction at a third time interval T3.

Figure 6A:
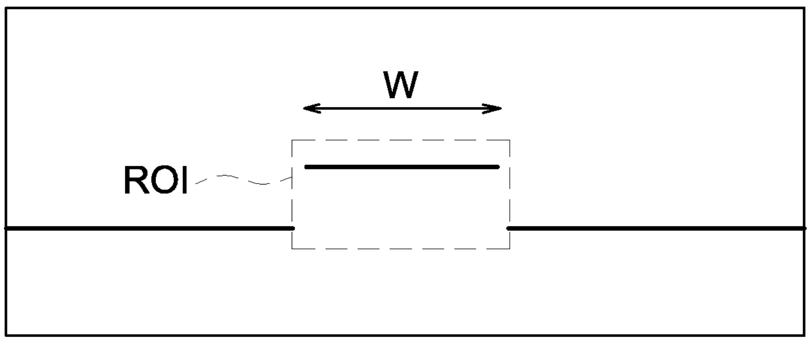
FIG. 6A is a schematic diagram of an image frame associated with a first light source and captured by an optical sensor of a mobile robot according to one embodiment of the present disclosure.
Figure 6B:
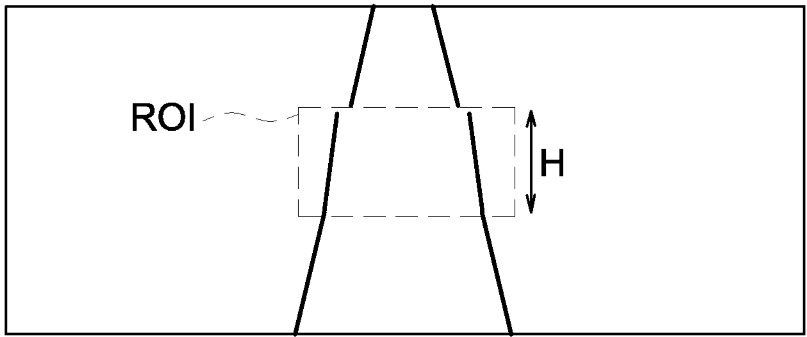
FIG. 6B is a schematic diagram of an image frame associated with a second light source and captured by an optical sensor of a mobile robot according to one embodiment of the present disclosure.

The optical sensor 11 is, for example, a CCD image sensor or a CMOS image sensor that captures a first image frame, a second image frame and a third image frame respectively within the first time interval T1, the second time interval T2 and the third time interval T3 using a sampling frequency. When the first image frame contains an obstacle, the first image frame has a broken line as shown in FIG. 6A; whereas, when the first image frame does not contain any obstacle, the first image frame only has a continuous (no broken line) transverse line. When the second image frame contains an obstacle, the second image frame has at least one broken line as shown in FIG. 6B, wherein an angle of the broken line is determined according a shape of obstacle and not limited to that shown in FIG. 6B; whereas, when the second image frame does not contain any obstacle, the second image frame only has two continuous (no broken line) tilted line. It is appreciated that FIGS. 6A and 6B are only intended to illustrate but not to limit the present disclosure.

It is appreciated that as the second light sources LS21 and LS22 project two parallel light sections on a moving surface, in the second image frame captured by the optical sensor 11, two parallel light sections present tilted lines. In addition, FIG. 6B only shows projected light sections on the moving surface captured by the optical sensor 11. When there is a wall in front of the mobile robot 100, the upper part of the second image frame will appear two parallel longitudinal light sections projected by the second light sources LS21 and LS22.

The position of broken line in the image frame reflects a position of the obstacle in front of the mobile robot 100. As long as the relationship between the position of broken line in the image frame and the actual distance of obstacles is previously recorded, a distance of one obstacle from the mobile robot 100 is obtainable when an image frame containing a broken line is captured.

As shown in FIG. 6A, the processor 13 already knows a predetermined distance from a transverse light section projected in front of the mobile robot 100 by the first light source LS1. Using the triangulation, the processor 13 calculates the distance and width of an obstacle when a broken line appears in an image of the transverse light section.

As shown in FIG. 6B, the processor 13 already knows longitudinal light sections being projected in front of the mobile robot 100 by the second light sources LS21 and LS22. Using the triangulation, the processor 13 calculates the distance and height of an obstacle according to a position and length in an image of the longitudinal light sections (i.e., tilted line) when at least one broken line appears in the image of the longitudinal light sections.

The processor 13 is electrically coupled to the first light source LS1, the second light sources LS21 and LS22, the third light source LS3 and the optical sensor 11, and used to control ON/OFF of light sources and the image capturing. The processor 13 further performs the range estimation according to the first image frame (e.g., FIG. 6A) and the second image frame (e.g., FIG. 6B), and performs the VSLAM according to the third image frame (containing object images actually being acquired), wherein details of the VSLAM are known to the art and thus are not described herein. The present disclosure is to execute different detections according to image frames captured by the same optical sensor 11 corresponding to the lighting of different light sources.

Referring to FIG. 2 again, the optical sensor 11 further captures a first dark image frame within a first dark interval Td1 of first light source behind the first time interval T1. The first dark image frame is used for differencing with the first image frame. The optical sensor 11 further captures a second dark image frame within a second dark interval Td2 of second light source behind the second time interval T2. The second dark image frame is used for differencing with the second image frame. For example, the processor 13 subtracts the first dark image frame from the first image frame, and subtracts the second dark image frame from the second image frame to eliminate background noises.

Although FIG. 2 shows that the first dark interval Td1 is behind the first time interval T1 and the second dark interval Td2 is behind the second time interval T2, the present disclosure is not limited thereto. In other aspects, the first dark interval Td1 is arranged prior to the first time interval T1 and the second dark interval Td2 is arranged prior to the second time interval T2. In another aspect, the optical sensor 11 captures only one dark image frame (e.g., prior to T1, between T1 and T2 or behind T2) within every cycle (e.g., an interval sequentially lighting every light source). The processor 13 subtracts the dark image frame from the first image frame and subtracts the dark image frame (the same one) from the second image frame. In this way, background noises are also cancelled and the total frame rate is increased.

In one aspect, the optical sensor 11 includes a pixel array. All pixels of the pixel array receive incident light via an IR light filter. For example, FIG. 1B shows that an IR pass filter 15 is further arranged in front of the optical sensor 11. The IR pass filter 15 is formed with an optics (e.g., coating on a lens) in front of the pixel array, or directly arranged upon every pixel of the pixel array.

Figure 3:
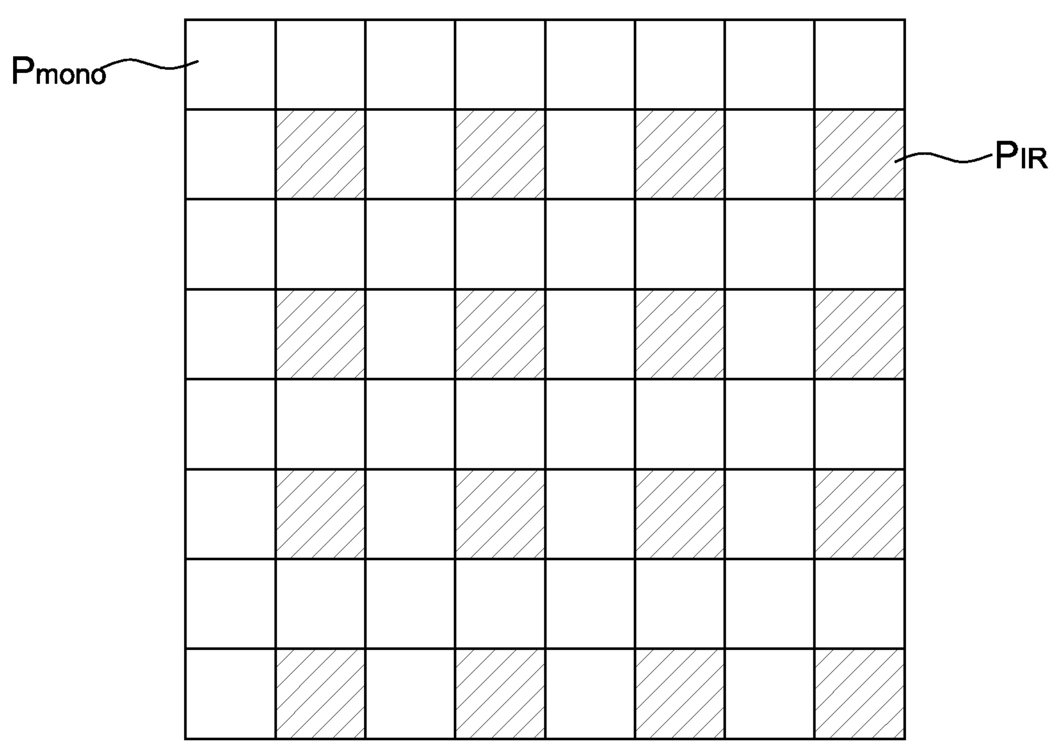
FIG. 3 is a schematic diagram of a pixel array of a mobile robot according to one embodiment of the present disclosure.

In another aspect, the pixel array of the optical sensor 11 includes a plurality of first pixels $P_{IR}$ and a plurality of second pixels $P_{mono}$, as shown in FIG. 3. The first pixels $P_{IR}$ are IR pixels, i.e. receiving incident light via a IR pass filter/film. The second pixels $P_{mono}$ receive incident light without via a IR pass filter/film. Preferably, the second pixels $P_{mono}$ receive incident light without passing any filter element. The incident light is referred to reflected light from the floor, wall and object in front of the mobile robot 100.

In the aspect including two pixel types, the first image frame and the second image frame mentioned above are formed by pixel data generated by the plurality of first pixels $P_{IR}$. That is, the processor 13 performs the range estimation only according to pixel data generated by the plurality of first pixels $P_{IR}$. The third image frame mentioned above is formed by pixel data generated by both the plurality of first pixels $P_{IR}$ and the plurality of second pixels $P_{mono}$ since the first pixels $P_{IR}$ and the second pixels $P_{mono}$ both detect infrared light when the third light source LS3 is emitting light. The processor 13 is arranged to process the pixel data corresponding to the lighting of different light sources.

In one aspect, the plurality of first pixels $P_{IR}$ and the plurality of second pixels $P_{mono}$ of the pixel array are arranged as a chessboard pattern as shown in FIG. 3. In other aspects, the first pixels $P_{IR}$ and the second pixels $P_{mono}$ are arranged in other ways, e.g., a left part or an upper part of the pixel array is arranged with the first pixels $P_{IR}$, and a right part or a lower part of the pixel array is arranged with the second pixels $P_{mono}$, but not limited thereto.

In the aspect that the first pixels $P_{IR}$ and the second pixels $P_{mono}$ are arranged in a chessboard pattern, the processor 13 further performs the pixel interpolation on the first image frame and the second image frame at first so as to fill interpolated data at positions in the first image frame and the second image frame corresponding the second pixels $P_{mono}$. After the pixel interpolation, the range estimation is performed.

When the pixel array of the optical sensor 11 is arranged as the chessboard pattern, the mobile robot 100 of the present disclosure may operate in another way to increase the frame rate of the range estimation and positioning (e.g., using VSLAM). In the aspect of FIG. 2, the frame rate of the range estimation and positioning is ⅕ of the sampling frequency of the optical sensor 11.

Figure 4:
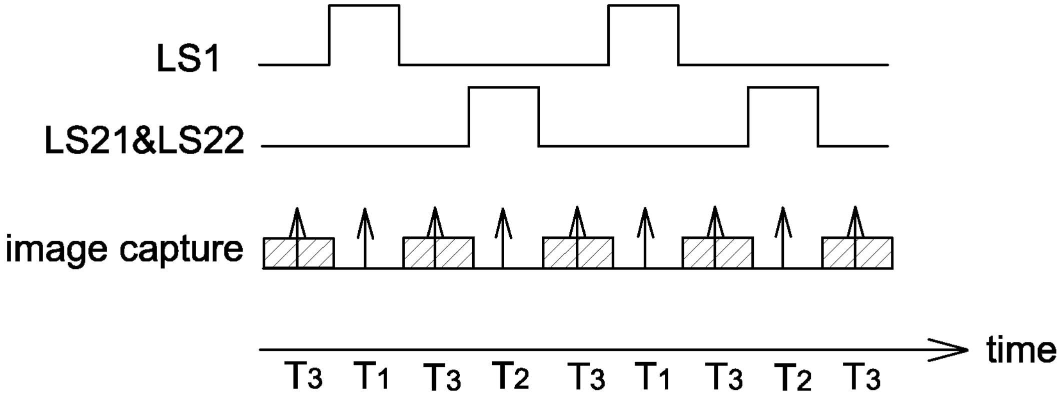
FIG. 4 is an operational timing diagram of a mobile robot according to a second embodiment of the present disclosure.

Referring to FIG. 4, it is an operational timing diagram of a mobile robot 100 according to a second embodiment of the present disclosure. The first light source LS1 projects a transverse light section toward the moving direction within a first time interval T1. The second light sources LS21 and LS22 respectively project a longitudinal light section toward the moving direction within a second time interval T2.

The pixel array of the optical sensor 11 captures a first image frame, a second image frame and a third image frame respectively within the first time interval T1, the second time interval T2 and a third time interval T3 between the first time interval T1 and the second time interval T2. That is, when the pixel array of the optical sensor 11 captures the third image frame, all light sources are not turned on. In FIG. 4, the third time interval T3 is shown by rectangular regions filled with slant lines.

The processor 13 performs the range estimation (e.g., including finding an obstacle and calculating a distance therefrom) according to the first image frame and the second image frame, wherein the first image frame and the second image frame are formed by pixel data generated by the plurality of first pixels $P_{IR}$. That is, when the first light source LS1 as well as the second light sources LS21 and LS22 are lighted up, pixel data associated with the first pixels $P_{IR}$ is not influenced by other colors of light, and thus the processor 13 is arranged to perform the range estimation according to the pixel data only associated with the plurality of first pixels $P_{IR}$.

In this embodiment, the third image frame is formed by pixel data generated by the plurality of second pixels $P_{mono}$.

Similarly, the processor 13 further performs the pixel differencing between the first image frame and the pixel data in the third image frame associated with the first pixels $P_{IR}$, and performs the pixel differencing between the second image frame and the pixel data in the third image frame associated with the first pixels $P_{IR}$ so as to eliminate background noises.

Similarly, when the first pixels $P_{IR}$ and the second pixels $P_{mono}$ are arranged in the chessboard pattern, before performing the range estimation, the processor 13 further performs the pixel interpolation on the first image frame and the second image frame to fill interpolated data at positions in the first image frame and the second image frame corresponding to the second pixels $P_{mono}$ at first. Then, the range estimation is performed.

In the second embodiment, the processor 13 performs the VSLAM according to pixel data in the third image frame associated with the second pixels $P_{mono}$ In this embodiment, the third light source LS3 is not lighted (e.g., the third light source LS3 may be omitted). Since the pixel data generated by the first pixels $P_{IR}$ exclude components outside IR spectrum, the third image frame of this embodiment is formed by pixel data generated by the plurality of second pixels $P_{mono}$. In addition, before performing the VSLAM according to the third image frame, the processor 13 further performs the pixel interpolation on the third image frame so as to fill interpolated data at positions in the third image frame corresponding to the first pixels $P_{IR}$.

It is seen from FIG. 4 that a frame rate of the range estimation is increased to ¼ (e.g., a frame period including T1+T2+2×T3) of the sampling frequency of the optical sensor 11, and a frame rate of the VSLAM is increased to ½ of the sampling frequency of the optical sensor 11.

However, when ambient light is not enough, the processor 13 may not able to correctly perform the VSLAM without lighting the third light source LS3. To solve this problem, the processor 13 further identifies ambient light strength according to the third image frame, e.g. comparing with a brightness threshold. When identifying that the ambient light is weak, the processor 13 further changes the lighting timing of the first light source LS1 as well as the second light sources LS21 and LS22. For example, the processor 13 controls the lighting of light sources and the image capturing as shown in FIG. 2. That is, under strong ambient light (e.g., an average brightness of the third image frame larger than a brightness threshold), the mobile robot 100 operates using the timing of FIG. 4; whereas under weak ambient light (e.g., the average brightness of the third image frame smaller than the brightness threshold), the mobile robot 100 operates using the timing of FIG. 2.

The present disclosure further provides a mobile robot that performs the ranging estimation and obstacle recognition according to images captured by the same optical sensor 11. When identifying that one obstacle is a specific object, e.g., a wire or socks, the mobile robot 100 directly moves across the obstacle; whereas when identifying that one obstacle is an electronic device, e.g., a cell phone, the mobile robot 100 dodges the electronic device without moving across it. The obstacle that can be moved across is determined previously according to different applications.

The mobile robot 100 of this embodiment is also shown as FIGS. 1A and 1B including a first light source LS1, second light sources LS21 and LS22, a third light source LS3, an optical sensor 11 and a processor 13. For example referring to FIG. 4, the first light source LS1 projects a transverse light section toward the moving direction within a first time interval T1; the second light sources LS21 and LS22 respectively project a longitudinal light section toward the moving direction within a second time interval T2. The third light source LS3 is used to illuminate a front area of the moving direction.

As mentioned above, to cancel the interference from ambient light, the optical sensor 11 further captures a first dark image frame, for differencing with the first image frame, within a first dark interval (e.g., T3 in FIG. 4) of first light source prior to or behind the first time interval T1; and captures a second dark image frame, for differencing with the second image frame, within a second dark interval (e.g., T3 in FIG. 4) of second light source prior to or behind the second time interval T2. The optical sensor 11 respectively captures the first image frame and the second image frame within the first time interval T1 and the second time interval T2.

In this embodiment, the pixel array of the optical sensor 11 receives incident light via the light filter 15.

The processor 13 identifies an obstacle according to the first image frame and the second image frame, wherein the method of identifying the obstacle has been described above and thus details thereof are not repeated herein. After the obstacle is found, the processor 13 controls the third light source LS3 to light up within a third time interval (e.g., T3 in FIG. 2) and controls the optical sensor 11 to capture a third image frame within the third time interval.

In this embodiment, before appearance of the obstacle is identified by the processor 13, the third light source LS3 is not lighted up, and thus the operational timing of the mobile robot 100 is shown as FIG. 4. When identifying that any obstacle appears, the processor 13 controls the third light source LS3 to emit light and controls the optical sensor 11 to capture one third image frame during the third light source LS3 is emitting light. In other aspects, more than one third image frame may be captured. In the present disclosure, capturing one third image frame is taken as an example for illustration. In this embodiment, the third image frame is for the object recognition using a pre-trained learning model.

After receiving the third image frame from the optical sensor 11, the processor 13 determines a region of interest (ROI) in the third image frame according to a position of obstacle (i.e. the position of broken line), e.g., shown in FIGS. 6A and 6B. As the present disclosure uses a single optical sensor, after the processor 13 identifies a position of obstacle and determines the ROI according to the first image frame and the second image frame, the ROI directly maps to a corresponding region in the third image frame.

In one non-limiting aspect, the ROI has a predetermined image size. That is, when the position (e.g., center or gravity center, but not limited to) of one obstacle is determined, the processor 13 determines a region of interest having the predetermined size at the position.

In another aspect, a size of the ROI is determined by the processor 13 according to the first image frame and the second image frame. In this case, when the obstacle is larger, the ROI is larger; on the contrary, the ROI is smaller.

The processor 13 then recognizes an object type of the obstacle in the ROI using a pre-trained learning model (e.g., embedded in the processor 13 by means of ASIC or firmware). As the learning model does not recognize (e.g., not calculating convolution) rest region in the third image frame outside the ROI, the computation loading, time and power consumption are significantly reduced. Meanwhile, as the ROI contains a small number of object images, the recognition is not interfered by other object images to improve the recognition correctness.

In addition, to further improve the recognition correctness, the processor 13 further identifies a height of obstacle according to the second image frame, e.g., taking a length H of the broken line in FIG. 6B as the height of an obstacle. The learning model further recognizes the object type according to the object height.

In one aspect, the object height is used as the learning material by the data network architecture (e.g., including neural network learning algorithm, deep learning algorithm, but not limited to) together with the ground truth image in a training phase to generate the learning model.

In another aspect, in the training phase, the data network architecture only uses the ground truth image to generate the learning model. In operation, when the learning model calculates the probability of several possible objects, the height is used to filter some possible objects. For example, if the height of one object type categorized by the learning model exceeds the height identified according to the second image frame, even though this one object type has the highest probability, the learning model still excludes this object type.

The method of categorizing the object in an image by the learning model is known to the art, and thus details thereof are not described herein. Meanwhile, the incorporation between the learning model and the object height to recognize the obstacle is not limited to that described in the present disclosure.

In one aspect, as a capturing frequency of the optical sensor 11 is higher than a moving speed of the mobile robot 100, the processor 13 further controls the first light source LS1, the second light sources LS21 and LS22, and the third light source LS3 to turn off for a predetermined time interval after the third time interval T3 (i.e. after capturing one third image frame) till the obstacle leaves the projection range of the first light source LS1. In this way, it is able to prevent repeatedly recognizing the same obstacle. The predetermined time interval is determined according to, for example, the moving speed of the mobile robot 100 and the height determined according to the second image frame.

Figure 5:
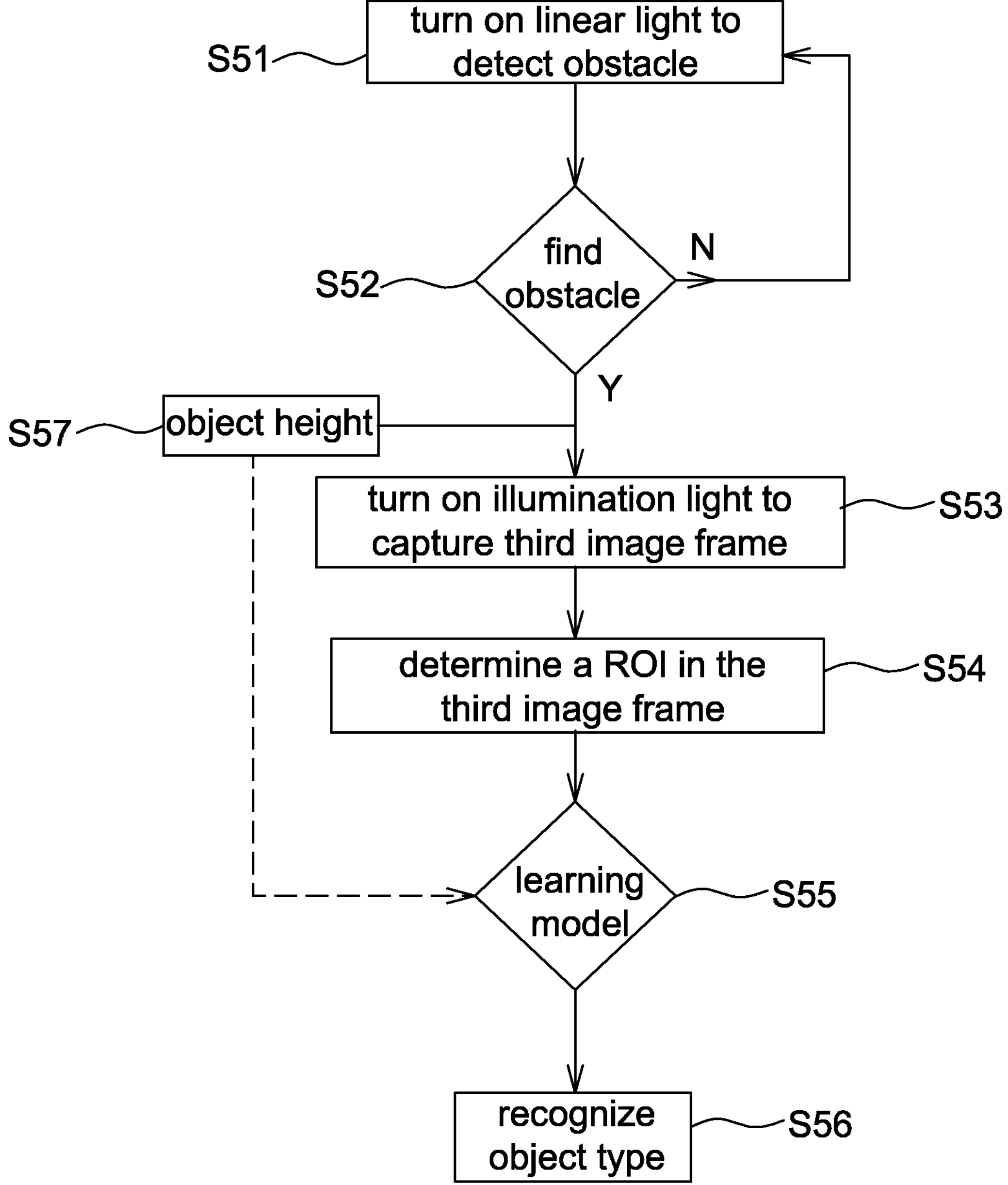
FIG. 5 is a flow chart of an operating method of a mobile robot according to a second embodiment of the present disclosure.

Referring to FIG. 5, it is a flow chart of an operating method of a mobile robot 100 according to one embodiment of the present disclosure, the method including the steps of: turning on linear light to detect an obstacle (Step S51); identifying whether an obstacle exists (Step S52); when there is no obstacle, moving back to Step S51 to continuous the detecting; whereas when there is one obstacle, turning on illumination light to capture a third image frame (Step S53); determining a region of interest (ROI) in the third image frame (Step S54); and using a learning model to recognize an object type (Steps S55-S56). This embodiment further includes an optional step: detecting an object height as an auxiliary in recognizing the object type (Step S57).

In this embodiment, the linear light includes, for example, the first light source LS1 as well as the second light source LS21 and LS22 mentioned above. The illumination light includes, for example, the third light source LS3 mentioned above. It is appreciated that positions of every light source shown in FIG. 1A is only intended to illustrate but not to limit the present disclosure.

Step S51: The processor 13 respectively controls the first light source LS1 as well as the second light source LS21 and LS22 to light up, for example, at the first time interval T1 and the second time interval T2 as shown in FIG. 4. Meanwhile, the processor 13 controls the optical sensor 11 to capture a first image frame and a second image frame respectively within the first time interval T1 and the second time interval T2.

Step S52: When identifying that the first image frame contains the broken line as shown in FIG. 6A or the second image frame contains the broken line as shown in FIG. 6B, the processor 13 identifies that there is an obstacle in front. The procedure then enters the Step S53; on the contrary, when the processor 13 identifies that both the first and second image frames do not contain any broken line, the Step S51 is entered to continuously detect an obstacle.

When identifying that the first image frame or the second image frame contains the broken line, the processor 13 further records (e.g., in the memory) a position of broken line as the object position.

Step S53: The processor 13 then controls the third light source LS3 to turn on, e.g., at the third time interval T3 shown in FIG. 2. The processor 13 also controls the optical sensor 11 to capture a third image frame, which contains at least one object image, within the third time interval T3. In an aspect that the processor 13 recognizes the object using a single image, the processor 13 controls the third light source LS3 to turn on for one third time interval V3. In one aspect, after the third time interval T3, the processor 13 controls the first light source LS1 as well as the second light sources LS21 and LS22 to operate using the timing shown in FIG. 4. In another aspect, after the third time interval T3, the processor 13 controls all light sources to turn off for a predetermined time interval to prevent detecting the same obstacle repeatedly and then operate using the timing shown in FIG. 4.

Step S54: The processor 13 then determines the ROI in the third image frame. The ROI is at the object position determined in the Step S52. As mentioned above, a size of the ROI is determined previously or determined according to a width W of the broken line in the first image frame (as shown in FIG. 6A) and a height H of the broken line in the second image frame (as shown in FIG. 6B).

Steps S55-S56: Finally, the processor 13 recognizes the object image within the ROI using the learning model trained before shipment to identify an object type.

Step S57: To increase the recognition correctness, when identifying an obstacle in the Step S52, the processor 13 further identifies an object height according to the second image frame, e.g., according to H in FIG. 6B. The identified object height helps the learning model to categorize and recognize the object type. The step S57 is selectively implemented.

After the object type is recognized, the processor 13 bypasses or dodges specific obstacles or directly moves across some obstacles according to previously determined rules. The operation after the object type being recognized is set according to different applications without particular limitations.

Figure 7:
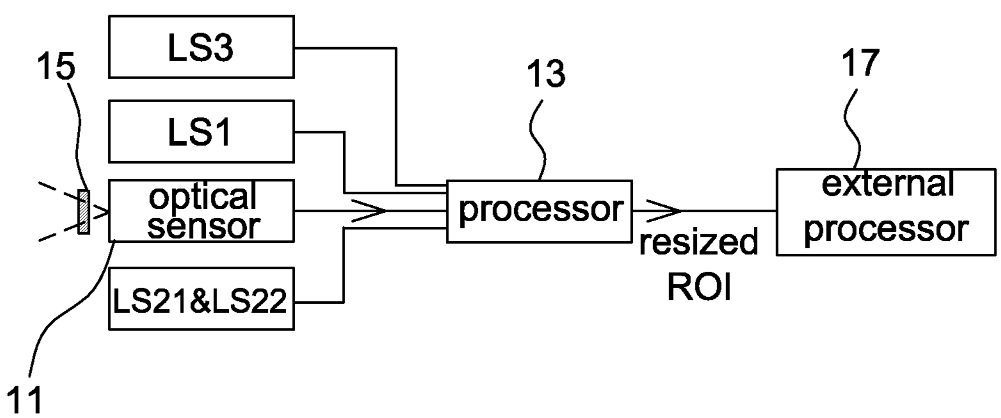
FIG. 7 is a schematic block diagram of a mobile robot according to an alternative embodiment of the present disclosure.

Please refer to FIG. 7, it is a schematic block diagram of a mobile robot according to an alternative embodiment of the present disclosure. The difference between embodiments of FIGS. 1B and 7 is that the embodiment of FIG. 7 further includes an external processor 17, and other components in FIG. 7 are identical to those of FIG. 1B.

Please refer to FIGS. 7 and 5 together, in this alternative embodiment, the processor 13 determines a region of interest (ROI), e.g., using FIGS. 6A and 6B, of an image frame (e.g., the third image frame mentioned above) captured by the optical sensor 11, and a pre-trained learning model is embedded in the external processor 17 outside the processor 13 since the image recognition by an AI engine needs more computing. In one aspect, the processor 13 is an application specific integrated sensor (ASIC) or a field programmable gate array (FPGA) of the optical sensor 13, and the external processor 17 is a central processing unit (CPU) or a micro control unit (MCU) of the mobile robot.

That is, the optical sensor 11 outputs pixel data of an image frame to the external processor 17 for the image recognition by a learning model embedded in the external processor 17. Generally, to obtain higher image recognition accuracy, the optical sensor 11 has a high resolution. If the whole image frame captured by the optical sensor 11 is transmitted to the external processor 17, it will lead to a lower report rate, higher computing power and higher false trigger since irrelevant pixel data (without containing object or obstacle information) is contained in the image frame. If it is possible to transmit pixel data only within the ROI to the external processor 17, a higher report rate, lower computing power and lower false trigger are obtainable since the processed data loading is lower and irrelevant pixel data is reduced. However, since the ROI is determined according to an object or obstacle image actually contained in the image frame, a size of the ROI is not fixed between image frames such that the ROI size is not suitable to an AI engine, which is embedded with a learning model for image recognition, only supporting fixed image size.

Accordingly, the present disclosure provides a mobile robot capable of generating a quantized ROI for the external processor 17 of the mobile robot to perform the image recognition. Said quantized ROI has a fixed size even though the ROI associated with the captured object or obstacle image is not fixed in successive image frames.

Figure 8:
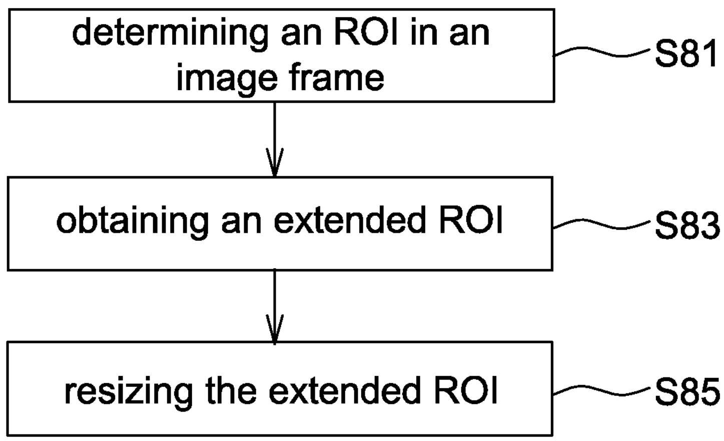
FIG. 8 is a flow chart of an operating method of a mobile robot according to an alternative embodiment of the present disclosure.

Please refer to FIG. 8, it is a flow chart of an operating method of a mobile robot according to an alternative embodiment of the present disclosure, including the steps of: determining a region of interest (ROI) in an image frame (Step S81); obtaining an extended ROI (Step S83); and resizing the extended ROI (Step S85).

Please refer to FIGS. 7 to 10B together, details of the operating method of this alternative embodiment are illustrated hereinafter.

Firstly, the optical sensor 11 captures image frames corresponding to, for example, lighting of different light sources as shown in FIG. 2. As mentioned above, a first light source LS1 projects a transverse light section toward a moving direction at a first time interval T1. Second light sources LS21 and LS22 respectively project a longitudinal light section toward the moving direction at a second time interval T2. A third light source LS3 illuminates a front area of the moving direction at a third time interval T3. The optical sensor 11 respectively captures a first image frame (e.g., IF1 shown in FIG. 9), a second image frame (e.g., IF2 shown in FIG. 9) and an image frame IF (e.g., the third image frame mentioned above) within the first time interval T1, the second time interval T2 and the third time interval T3. The processor 13 determines an ROI in the image frame IF according to at least one of the first image frame IF1 and the second image frame IF2. In one aspect, the operation of the multiple light sources are referred to FIG. 2. As mentioned above, the processor 13 may calculate a difference between bright-dark images to eliminate background noise.

As mentioned above, because the first image frame IF1, the second image frame IF2 and the image frame IF are captured by the same optical sensor 11, once an ROI is determined in the first image frame IF1 or the second image frame IF2, a corresponding region in the image frame IF is determined.

In one aspect, the mobile robot of the present disclosure includes only one of the first light source LS1 and the second light sources LS21 and LS22 such that the processor 13 determines the ROI according to one of the first image frame IF1 and the second image frame IF2.

In one aspect, the optical sensor includes a pixel array having a plurality of first pixels and a plurality of second pixels, and details thereof have been illustrated above, and thus are not repeated herein. The image capturing and the light sources activation are changed corresponding to ambient light, e.g., according to FIG. 2 or FIG. 4.

Figure 9:
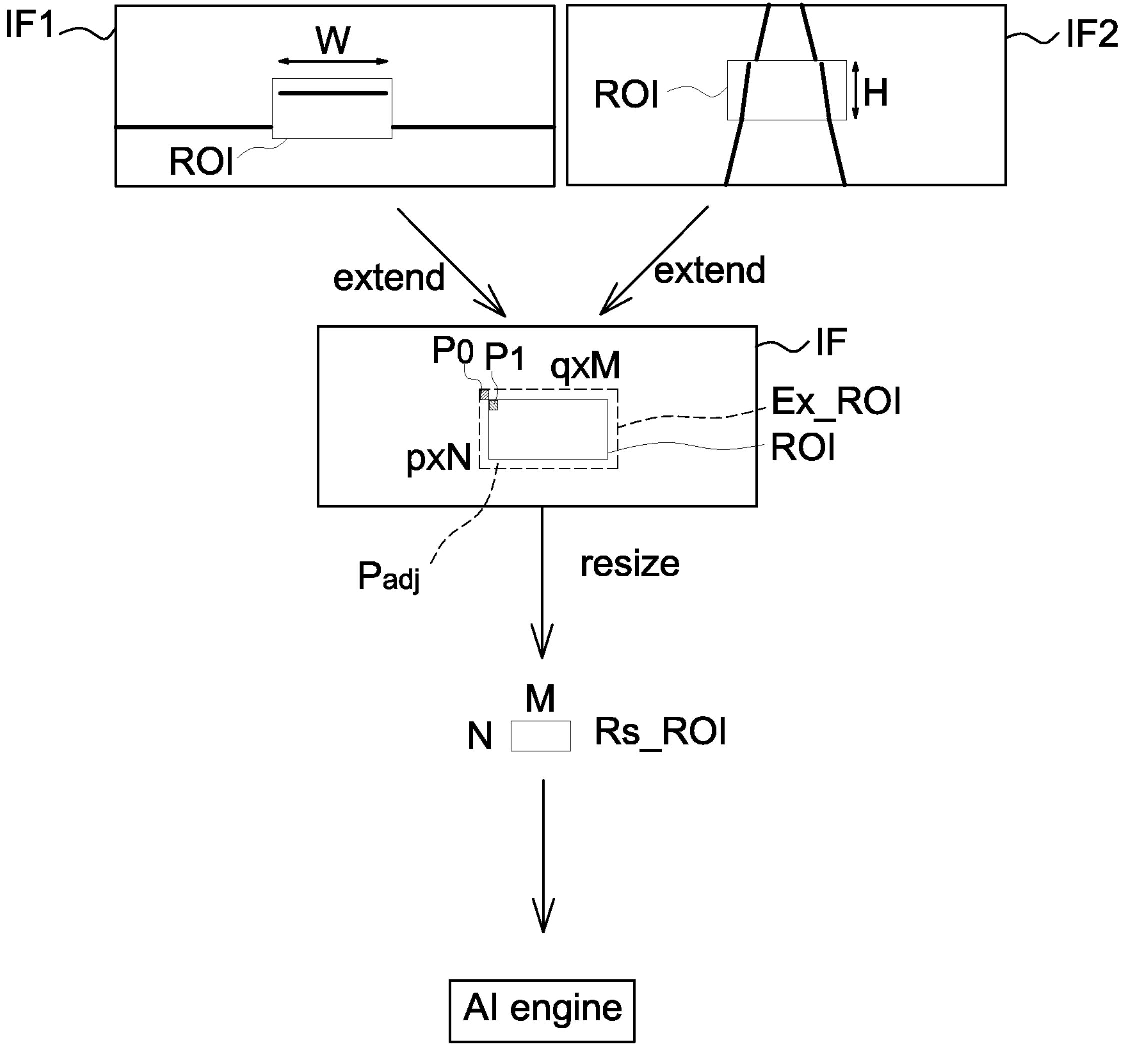
FIG. 9 is a schematic diagram of an operating method of a mobile robot according to an alternative embodiment of the present disclosure.

Step S81: As shown in FIG. 9, the processor 13 determines an ROI (e.g., a rectangle of solid line) in an image frame IF captured by the optical sensor 11. As a size of the ROI is determined according an actual object or obstacle image being captured, e.g., as shown in IF1 and/or IF2, the changed image size is not suitable to be processed by an AI engine, which is embedded with a training model, for processing an image of a fixed size, e.g., N×M mentioned below.

Step S83: Next, the processor 13 extends the size of the ROI from an edge of the ROI to an integer times of a predetermined size to obtain an extended ROI (e.g., a rectangle of dash line). For example, the processor 13 incorporates at least one of pixel rows (e.g., a region between the solid line and dash line adjacent to an upper side and a lower side of the ROI in FIG. 9) and pixel columns (e.g., a region between the solid line and dash line adjacent to a left side and a right side of the ROI in FIG. 9) adjacent to the ROI in the image frame IF with the ROI to obtain the extended ROI (shown as Ex_ROI). Therefore, the extended ROI is larger than the ROI.

For example, the predetermined size is N×M, which is a size of image to be inputted into an AI engine, and the integer times is (p×N)×(q×M), wherein p is identical to or different from q depending on the captured object or obstacle image. If one of a longitudinal size (e.g., in size-N direction) and a transverse size (e.g., in size-M direction) is not an integer times of the predetermined size N×M, the processor 13 extends the longitudinal size and/or the transverse size to respectively be equal to (p×N) and (q×M). Preferably, values of p and q are selected as small as possible. If it is possible (the ROI being extended by an even number of pixels), the processor 13 incorporates a same number of pixel rows adjacent to two opposite sides (e.g., upper and lower sides) of the ROI with the ROI to obtain the extended ROI, and incorporates a same number of pixel columns adjacent to two opposite sides (e.g., left and right sides) of the ROI with the ROI to obtain the extended ROI.

In the scenario that when one side of the ROI is at an edge of the image frame IF, the processor 13 incorporates the pixel rows or the pixel columns only adjacent to a side of the ROI opposite to the one side with the ROI to obtain the extended ROI.

Figure 10A:
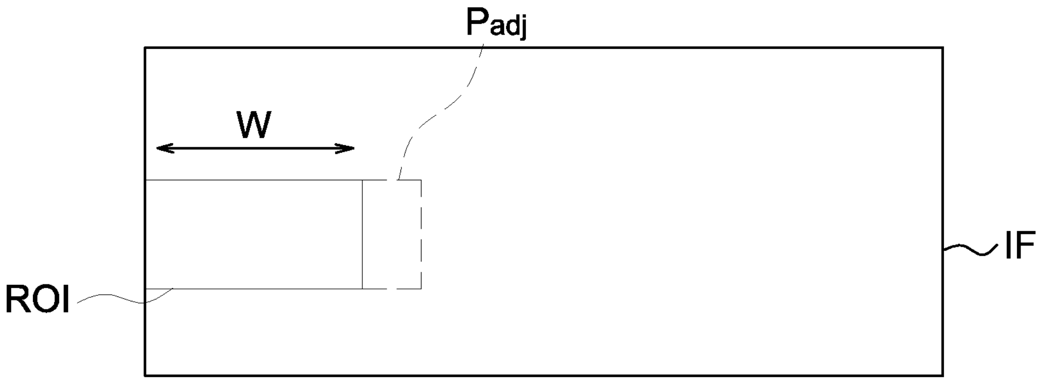
FIGS. 10A-10B are schematic diagrams of obtaining an extended ROI by a mobile robot according to an alternative embodiment of the present disclosure.

For example, FIG. 10A shows that a left side of the ROI is at a left edge of the image frame IF, the processor 13 only incorporates pixel rows $P_{adj}$ adjacent to a right side of the ROI with the ROI to obtain the extended ROI. Similarly, when a right side of the ROI is at a right edge of the image frame IF, the processor 13 only incorporates pixel rows $P_{adj}$ adjacent to a left side of the ROI with the ROI to obtain the extended ROI.

Figure 10B:
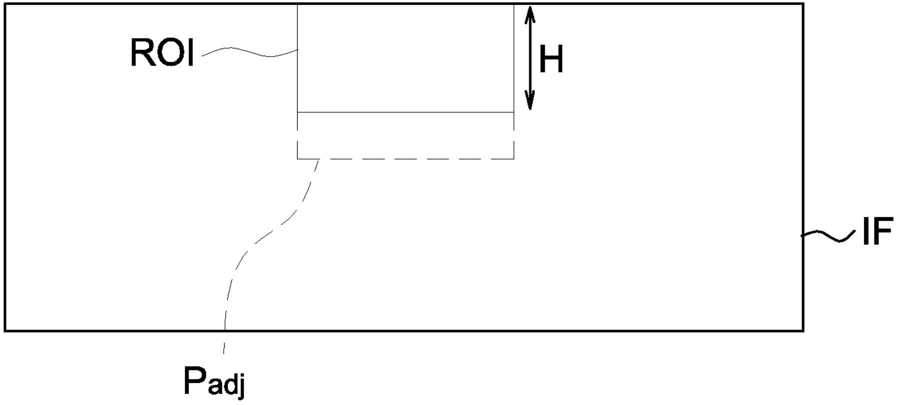

For example, FIG. 10B shows that an upper side of the ROI is at an upper edge of the image frame IF, the processor 13 only incorporates pixel rows $P_{adj}$ adjacent to a lower side of the ROI with the ROI to obtain the extended ROI. Similarly, when a lower side of the ROI is at a lower edge of the image frame IF, the processor 13 only incorporates pixel rows $P_{adj}$ adjacent to an upper side of the ROI with the ROI to obtain the extended ROI.

Similarly, when two sides of the ROI are at two edges of the image frame IF, the incorporated pixel rows and pixel columns are adjacent to the rest two sides of the ROI close to a center of the image frame IF.

However, if the processor 13 identifies that the size of ROI is just equal to an integer times of the predetermined size N×M, the ROI is not extended, and the process moves to S85. That is, the extended ROI is the ROI.

Step S85: Finally, the processor 13 resizes (or downsizes) the extended ROI, with a size (p×N)×(q×M), to the predetermined size N×M, wherein p and q are positive integers. For example, the processor 13 samples one pixel every p pixels in an N-size direction (e.g., a longitudinal direction in FIG. 9), and samples one pixel every q pixels in an M-size direction (e.g., a transverse direction in FIG. 9) in resizing the extended ROI.

In one aspect, the processor 13 samples the one pixel (either in the longitudinal direction or the transverse direction) from a first pixel, e.g., P1 shown in FIG. 9, of the ROI since it is known that the incorporated pixels in Step S83 do not contain information of an object or obstacle. In another aspect, the processor 13 samples the one pixel from a first pixel, e.g., P0 shown in FIG. 9, of the extended ROI.

A number of pixels equidistantly sampled in the longitudinal direction is N, and a number of pixels equidistantly sampled in the transverse direction is M. In this way, the ROI is firstly extended and then downsized before being inputted into the AI engine, which is embedded with a model previously trained to recognize images of predetermined objects or obstacles.

It should be mentioned that although the above embodiment is described in the way that the optical sensor 13 outputs a resized ROI to the external processor 17, the present disclosure is not limited thereto. In another aspect, the processor 13 outputs the extended ROI to the external processor 17, and the external processor 17 firstly resizes the received extended ROI to obtain a resized ROI, with the predetermined size N×M, and then the resized ROI is inputted into an AI engine therein. In this way, since the a size of the extended ROI is generally smaller than the image frame IF, the computing loading is still reduced.

In another aspect, the processor 13 does not extend the ROI but directly resizes the ROI, i.e. not performing S83 of FIG. 8.

In this aspect, after the processor 13 determines a ROI in the image frame IF, the processor 13 calculates a ratio of a size of the ROI with respect to a predetermined size N×M, which is smaller than the size of the ROI. The ratio is used to determine how many pixels in the ROI need to be sampled so as to resize the ROI to the predetermined size N×M.

For example, when the predetermined size is N×M, a first ratio in an N-size direction is p, a second ratio in an M-size direction is q, wherein p and q are selected as integers. More specifically, if the calculated ratio is not an integer, the processor 13 directly omits the decimal part to obtain p and q. For example, if a height of the ROI is 3.2 time of N, then p is selected as 3; and if a width of the ROI is 4.7 time of M, then q is selected as 4. In one aspect, the processor 13 samples one pixel every p pixels in the N-size direction, and samples one pixel every q pixels in the M-size direction. In another aspect, the processor 13 samples one pixel every (p+1) pixels in the N-size direction, and samples one pixel every (q+1) pixels in the M-size direction.

A number of pixels sampled in the longitudinal direction is N, and a number of pixels sampled in the transverse direction is M. In this way, it is also possible to obtain a size-fixed image to be inputted into the AI engine even though the ROI determined according to the captured object or obstacle image is not fixed. As mentioned above, the processor 13 is selected to stop calculate the ROI within a predetermined after a previous ROI is determined.

It should be mentioned that although the above embodiments are illustrated in the way that a ROI is determined according to whether there is a broken part in a transverse light section and/or a longitudinal light section, the present disclosure is not limited thereto. In another aspect, the ROI is determined according to an image frame captured by the optical sensor 11 when the illumination light source (e.g., the third light source) is lighting, and the ROI is determine according to pixels having a gray level larger than a threshold.

Although the above embodiment is illustrated in the way that an AI engine is embedded in a different processor from the processor for determining the quantized ROI (i.e. resized ROI), the present disclosure is not limited thereto. In another aspect, the AI engine is embedded in the same processor with the processor for determining the quantized ROI. The two processors shown in FIG. 7 are both arranged in the mobile robot.

The present disclosure further provides a mobile robot (e.g., 100 shown in FIG. 1A) that performs the range estimation as well as VSLAM and/or image recognition using image frames captured by the same optical sensor (e.g., 11 shown in FIGS. 1A and 1B).

The mobile robot 100 in this embodiment includes a linear light source, an optical sensor 11, a dual-bandpass filter and a processor 13. Details of the optical sensor 11 and the processor 13 have been illustrated above, and thus are not repeated herein.

The linear light source is selected from at least one of the first light source LS1 and the second light sources LS21 and LS22 mentioned above. That is, the linear light source projects a transverse light section toward a moving direction of the mobile robot 100 when the first light source LS1 is used; and the linear light source projects longitudinal light sections toward the moving direction of the mobile robot 100 when the second light sources LS21 and LS22 are used. More specifically, the linear light source of this embodiment projects a linear light section, including at least one of a transverse light section and a longitudinal light section, toward the moving direction.

Figure 13A:
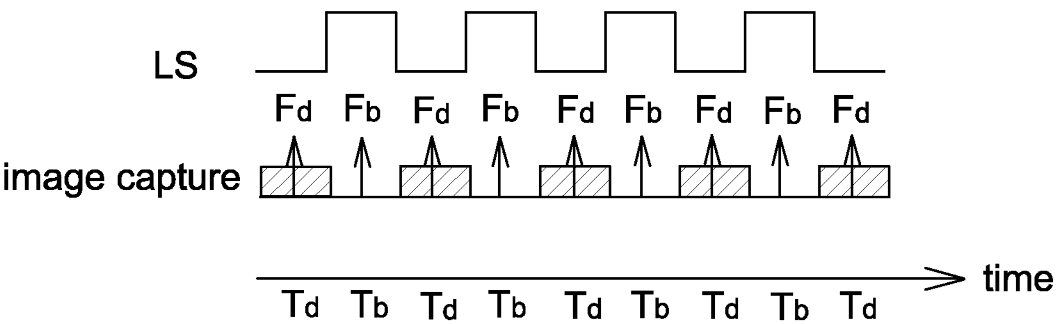
FIGS. 13A-13B are operational timing diagrams of a mobile robot according to an alternative embodiment of the present disclosure.

Please refer to FIG. 13A, the optical sensor 11 captures a bright image frame Fb when the linear light source is turned on, and captures a dark image frame Fd when the linear light source is turned off. In FIG. 13A, LS indicates lighting of the linear light source, Td indicates an interval during which the linear light source is turned off, and Tb indicates an interval during which the linear light source is turned on.

Figure 13B:
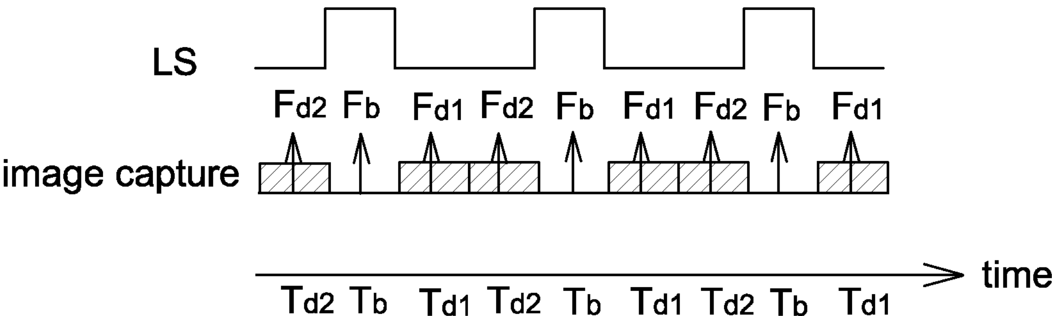

Please refer to FIG. 13B, the optical sensor 11 captures a bright image frame Fb when the linear light source is turned on, and captures a dark image frame Fd1 and Fd2, respectively, when the linear light source is turned off. In FIG. 13B, LS indicates lighting of the linear light source, Td1 and Td2 indicate intervals during which the linear light source is turned off, and Tb indicates an interval during which the linear light source is turned on.

Figure 11A:
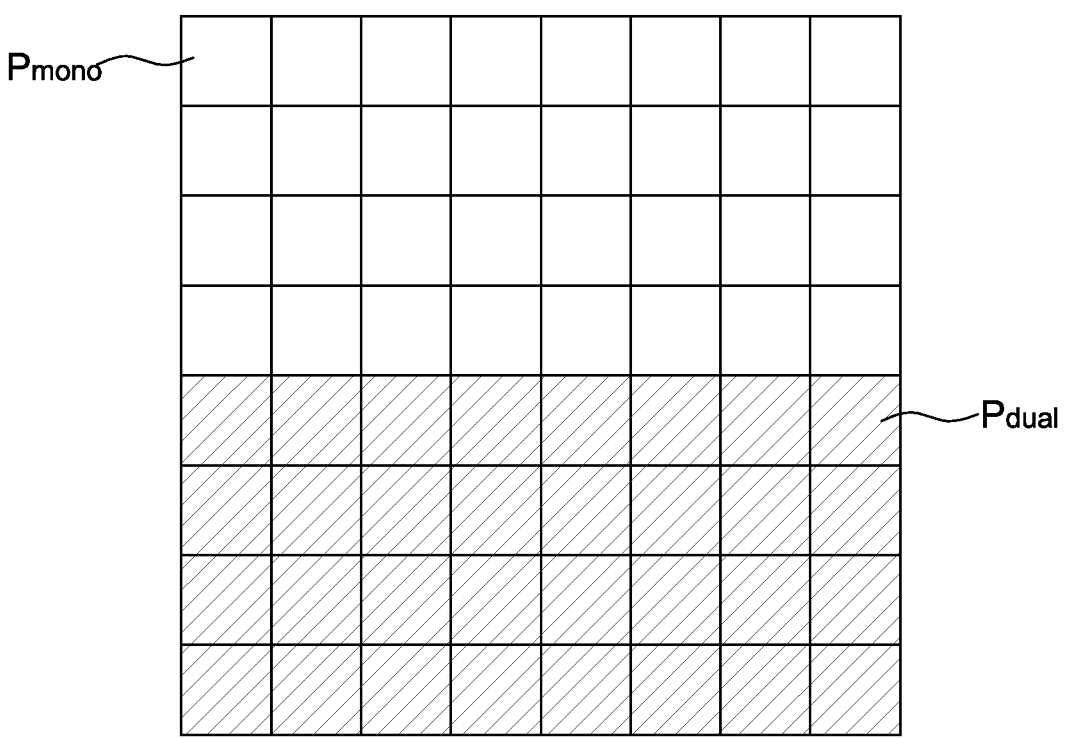
FIGS. 11A-11B are schematic diagrams of a dual-bandpass filter arranged corresponding to a pixel array according to an alternative embodiment of the present disclosure.
Figure 12:
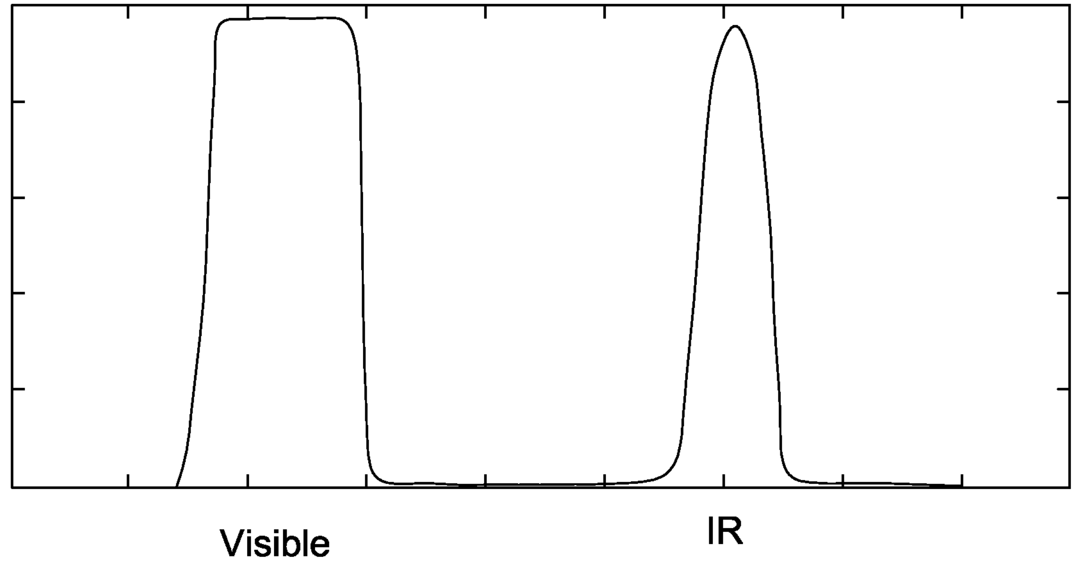
FIG. 12 is a schematic diagram of spectrum of the pass band of the dual-bandpass filter in FIGS. 11A-11B.

In this embodiment, the mobile robot 100 further includes a dual-bandpass filter arranged at a light incident path of the optical sensor 11. More specifically, the dual-bandpass filter is coated on a lens (e.g., 15 shown in FIG. 1B and FIG. 7) arranged at a light incident path of the optical sensor 11 or directly coated on the pixel array. The dual-bandpass filter is arranged at a part of or all of the light incident path of the optical sensor 11. For example, FIG. 11A shows that the dual-bandpass filter is arranged at a lower part of the light incident path of the optical sensor 11 such that pixels (shown as $P_{dual}$) covered or overlapped by the dual-bandpass filter (shown by tilt lines) receive light energy passing the dual-bandpass filter. In this embodiment, the dual-bandpass filter is an IR and visible light pass filter. FIG. 12 shows spectrum of the pass band of the dual-bandpass filter.

In the present disclosure, pixels that are covered or overlapped by the dual-bandpass filter are determined according to a region of the pixel array used to capture an image of the linear light section. That is, if a region of the pixel array used to capture the image of the linear light section is at an upper part or a central part of the pixel array, pixels that are covered or overlapped by the dual-bandpass filter are at an upper part or a central part of the pixel array. In another aspect, if the second light source LS21 and/or LS22 is user, pixels that are covered or overlapped by the dual-bandpass filter are at a longitudinal region of the pixel array.

As mentioned above, in one aspect, pixels $P_{mono}$ are not covered by any filter.

Figure 11B:
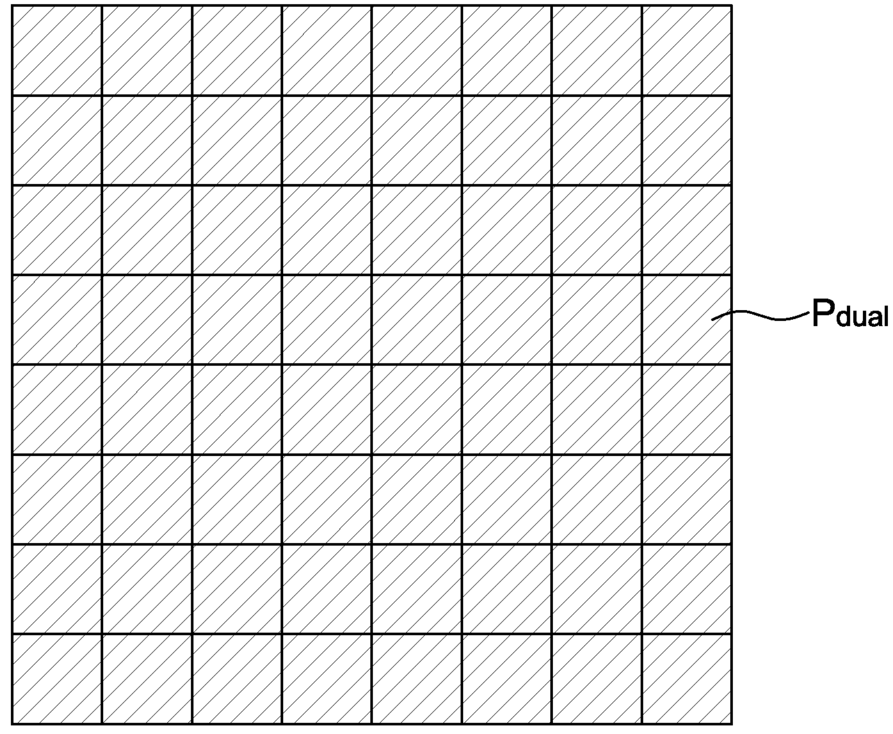

FIG. 11B shows that all pixels of the pixel array are covered or overlapped by the dual-bandpass filter such that all pixels $P_{dual}$ receive light energy passing the dual-bandpass filter.

The processor 13 is electronically coupled to the linear light source and the optical sensor 11 to control the lighting of the linear light source and control the image capturing of the optical sensor 11, e.g., as shown in FIGS. 13A and 13B. The processor 13 calculates a differential image frame between the bright image frame Fb and dark image frame Fd (e.g., calculating Fb-Fd pixel-by-pixel), performs range estimation using the differential image frame (Fb-Fd); and performs visual simultaneous localization and mapping (VSLAM) or image recognition using the dark image frame Fd or another dark image frame Fd2 captured by the optical sensor 11.

For example, in the aspect of FIG. 13A, the mobile robot 100 includes two frame buffers. One of the two frame buffers stores the differential image frame (Fb-Fd) between the bright image frame Fb and dark image frame Fd; and the other one of the two frame buffers stores the dark image frame Fd. The processor 13 performs the range estimation using the differential image frame (Fb-Fd); and performs the VSLAM or image recognition using the dark image frame Fd.

For example, in the aspect of FIG. 13B, the mobile robot includes one frame buffer. The one frame buffer alternatively stores the differential image frame (Fb-Fd1) and the dark image frame Fd2. The differential image frame is used to cancel out the ambient light interference. The processor 13 performs the range estimation using the differential image frame (Fb-Fd1); and performs the VSLAM or image recognition using the dark image frame Fd2. It is also possible to employ two frame buffers in the case of FIG. 13B.

In one aspect, the mobile robot 100 does not include the third light source LS3. That is, the processor 13 performs the VSLAM or image recognition only when the dark image frame has enough brightness (e.g., higher than a threshold). In another aspect, the mobile robot 100 includes a third light source LS3, which is turned on corresponding to intervals Td2 of FIG. 13B such that the VSLAM and the image recognition are also performed when the ambient light is weak. The "dark" image means an image frame being captured upon the linear light source being turned off.

In the aspect of FIG. 11B, the processor 13 performs the range estimation using the whole differential image frame and performs the VSLAM or image recognition using the whole dark image frame Fd or Fd2.

In the aspect of FIG. 11A, the processor 13 performs the range estimation using a region of interest (e.g., filled with tilt lines) of the pixel array covered or overlapped by the dual-bandpass filter since the linear light section image appears in a part of the whole bright image frame Fb such that the calculation loading is reduced. In one aspect, pixel data outside the region of interest is not used in identifying the existence of an obstacle and calculating an obstacle distance. The processor 13 performs the VSLAM or image recognition using the whole dark image frame Fd or Fd2.

Details of performing the range estimation, VSLAM and image recognition have been illustrated above, and thus are not repeated again.

In an alternative embodiment of the present disclosure, in the image recognition, the processor 13 or 17 recognizes a code indicated by a Tag. In the present disclosure, the Tag is an AprilTag or a vendor defined Tag. The AprilTag has good invariance at different rotation angles and different image sizes. The AprilTag can be printed by a user without purchasing additionally.

The mobile robot (e.g., 100 shown in FIG. 1A) of the present disclosure further includes a memory (including volatile memory and/or non-volatile memory) previously stores information of different Tags. The processor 13 or 17 controls the mobile robot 100 to perform different operations corresponding to different Tags. It is appreciated that the mobile robot 100 is embedded with or able to download from internet or storage medium an algorithm and/or associated codes for recognizing different Tags.

In one aspect, the Tag is used as a virtual wall such that the processor 13 or 17 controls the mobile robot 100 to change a moving direction thereof when a predetermined Tag is recognized. Furthermore, the processor 13 or 17 controls the mobile robot 100 to change the moving direction thereof at different distances from the Tag. For example, when a first Tag (or first code) is recognized by the processor 13 or 17, the processor 13 or 17 controls the mobile robot 100 to change the moving direction thereof at 10 cm, but not limited to, from the Tag; and when a second Tag (or second code) is recognized by the processor 13 or 17, the processor 13 or 17 controls the mobile robot 100 to change the moving direction thereof at 5 cm, but not limited to, from the Tag.

In another aspect, the Tag is used as a virtual mark such that the processor 13 or 17 controls the mobile robot 100 to operate in a different mode when a predetermined Tag is recognized. For example, when a third Tag (or third code) is recognized by the processor 13 or 17, the processor 13 or 17 controls the mobile robot 100 to change the suction power, to change illumination light and/or start to spray liquid on the working surface, e.g., the third Tag indicating a different surface behind the Tag. In this aspect, the processor 13 or 17 controls the mobile robot 100 not to change a moving direction thereof and to directly move across the Tag. It is possible to arranged different operations corresponding to different Tags. The information associated with the first, second and third code are previously recorded in the memory.

Figure 14:
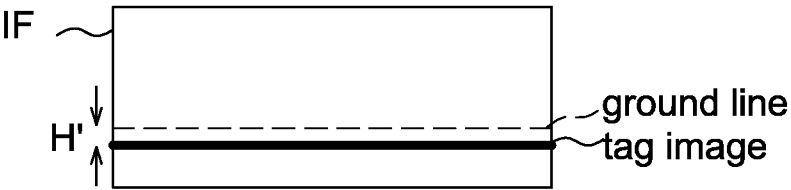
FIG. 14 is schematic diagram of an image frame captured by an optical sensor of a mobile robot according to an alternative embodiment of the present disclosure.

Please refer to FIG. 14, it is a schematic diagram of an image frame IF captured by the optical sensor 11 via the dual-bandpass filter as shown in FIG. 11A or 11B when the linear light source is turned off. The memory further records a distance of a ground line, which is corresponding to a linear light section image of a transverse light section projected by the linear light source.

To reduce the computation loading, in one aspect the processor 13 or 17 recognizes the Tag only when a tag image appears closer than the distance of the ground line. In one aspect, it is pre-set a window of interest (WOI) in the image frame IF below the ground line in the image frame IF, and the processor 13 or 17 recognizes the Tag only when a tag image thereof appears within the WOI, i.e. below dashed line in the image frame IF. In another aspect, the processor 13 or 17 calculates a distance (e.g., a number of pixels) H' between the ground line (e.g., previously recorded in the memory) and the tag image so as to determine a distance or depth (in actual space) from the Tag according to H'. For example, the memory further previously records a relationship between H' and depths of the Tag calculated using triangulation. The processor 13 or 17 is arranged to control the mobile robot 100 to perform a predetermined operation when a predetermined distance or depth is reached, e.g., changing direction or operation mode as mentioned above.

It should be mentioned that although the above embodiments are described in the way that the second light sources LS21 and LS22 are turned on and off together, the present disclosure is not limited thereto. In other aspects, LS21 and LS22 are turned on sequentially (and optical sensor capturing images correspondingly) as long as LS21 and LS22 respectively project a longitudinal light section toward the moving direction.

Figure 15:
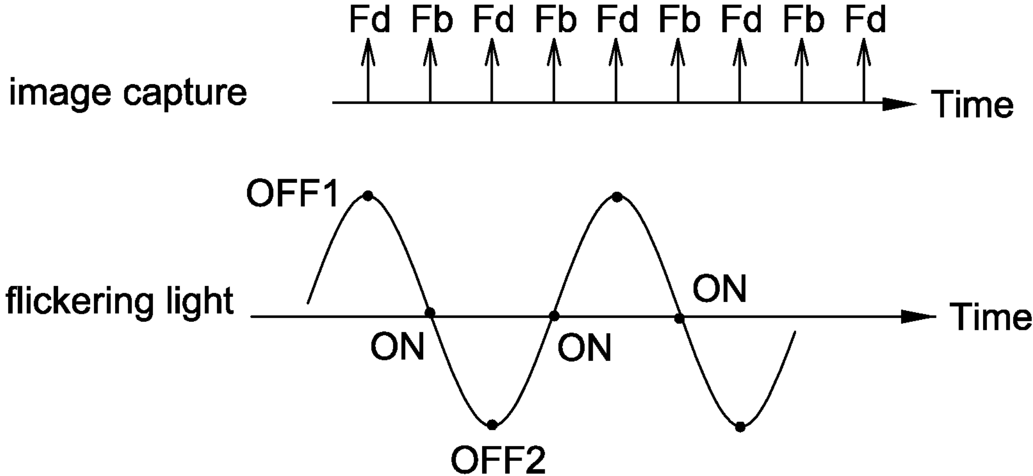
FIG. 15 is a schematic diagram of flickering light and operations of a mobile robot according to a further embodiment of the present disclosure.

As mentioned above, the processor 13 performs range estimation using a differential image frame so as to remove background noises. However, if there is existing flickering light, as shown in FIG. 15, in environment due to the alternating current (AC) nature of a power system, the differential image frame is not able to fully remove the flicker noise such that an error identification in the range estimation may occur. Especially in the case that a field of view of the optical sensor 11 is tilted upward in the moving direction such that fluorescent light sources located at a ceiling are covered by the field of view to be captured by the optical sensor 11.

Therefore, the present disclosure further provides a de-flicker method for a mobile robot 100 of the present disclosure for dealing with a scenario that the field of view of the optical sensor 11 is tilted toward the ceiling.

Please refer to FIG. 15, it is a schematic diagram of the image capturing of the optical sensor 11 corresponding to flickering light, in which the Fd (called dark image frame) refers to an image frame being captured when the linear light source is turned off, and the Fb (called bright image frame) refers to an image frame being captured when the linear light source is turned on. In this aspect, the mobile robot 100 performs the range estimation (i.e. calculating an obstacle distance) according to a broken line within an image of a longitudinal light section in an image frame captured by the optical sensor 11, e.g., as shown in FIG. 6B. The method for the processor 13 to calculate the obstacle distance according to an image of the longitudinal light section has been illustrated above, and thus details thereof are not repeated herein.

In this aspect, the mobile robot 100 includes a light source (e.g., at least one of LS21 and LS22 shown in FIGS. 1A and 1B) for projecting a longitudinal light section toward a moving direction of the mobile robot 100. It is seen from FIGS. 15 and 16 that the optical sensor 11 sequentially captures a dark image frame IF_OFF1 when the light source is turned off, captures a bright image frame IF_ON when the light source is turned on and captures a dark image frame IF_OFF2 when the light source is turned off, similar to FIG. 13A. It should be mentioned that the temporal relationship between the flicking light and the lighting of linear light source and the capturing of optical sensor is not limited to those shown in FIG. 15.

Figure 16:
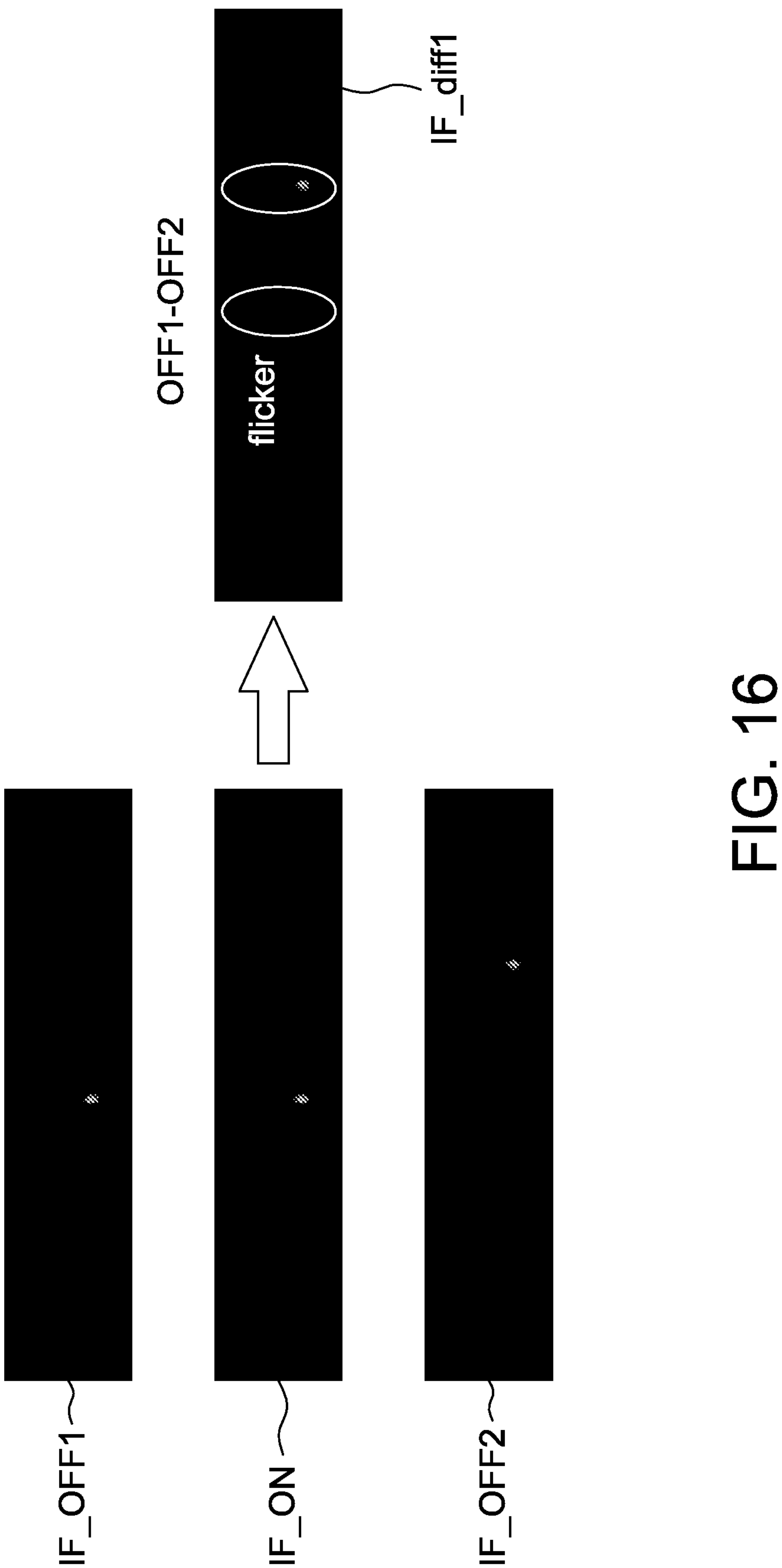
FIG. 16 is a schematic diagram of image frames captured by an optical sensor of a mobile robot according to a further embodiment of the present disclosure.

Please refer to FIG. 16, it is a schematic diagram of a first dark image frame IF_OFF1 captured at a first time interval, a bright image frame IF_ON captured at a second time interval and a second dark image frame IF_OFF2 captured at a third time interval corresponding to FIG. 15. In this aspect, flickers are determined according to a differential image frame IF_diff1 between the first dark image frame IF_OFF1 and the second dark image frame IF_OFF2. It is appreciated that the differential image frame IF_diff1 is also obtainable by calculating IF_OFF2−IF_OFF1.

Figure 17:
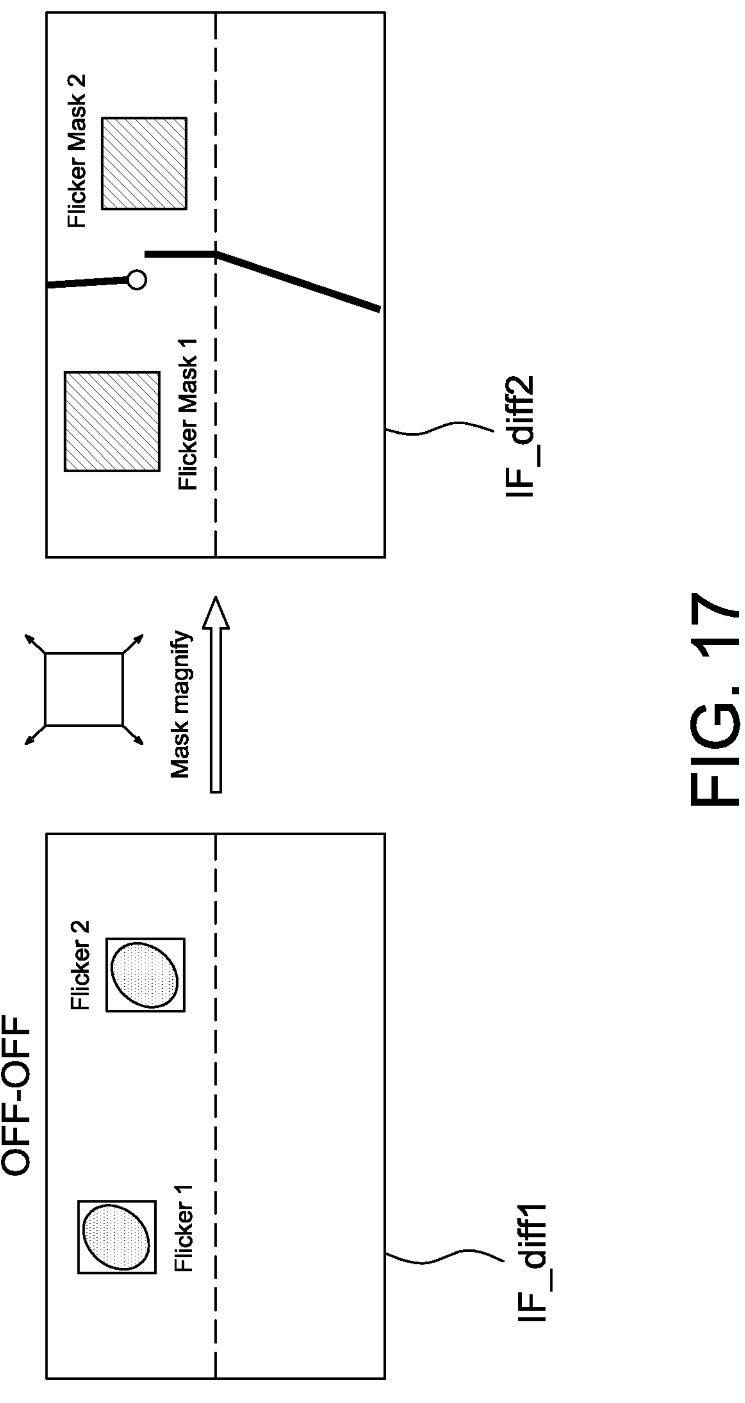
FIG. 17 is a schematic diagram of de-flickering used in a mobile robot according to a further embodiment of the present disclosure.

Please refer to FIG. 17, in this aspect, the processor 13 firstly determines at least one flicker region by calculating a first differential image frame IF_diff1 between the first dark image frame IF_OFF1 and the second dark image frame IF_OFF2, e.g., showing two flicker regions Flicker1 and Flicker2 in IF_diff1, but not limited to two flicker regions. For example, the flicker region(s) is determined according to pixels that have gray levels larger than or equal to a predetermined threshold in the first differential image frame IF_diff1. Then, the processor 13 calculates a second differential image frame IF_diff2 between the bright image frame IF_ON and one of the first dark image frame IF_OFF1 and the second dark image frame IF_OFF2. Finally, the processor 13 uses the at least one flicker region in the second differential image frame IF_diff2 as at least one flicker mask, e.g., shown as Flicker Mask1 and Flicker Mask2 in IF_diff2, but not limited to two masks. Because the first differential image frame IF_diff1 and the second differential image frame IF_diff2 have the same size, the position and size of a flicker mask is correspondingly determined after a flicker region is determined in the first differential image frame IF_diff1.

In this embodiment, the processor 13 performs the range estimation using the second differential image frame IF_diff2 with at least one flicker mask therein, wherein pixel data within the at least one flicker mask is ignored, i.e. not used in calculating the obstacle distance. More specifically, only broken lines outside the flicker masks are used in the range estimation.

In some scenarios, the flicker noise spills to adjacent pixels of the flicker mask(s) in the second differential image frame IF_diff2. Therefore, to fully remove and cancel the flicker noise, in determining the flicker mask(s) according to the flicker region(s), the processor 13 performs dilation on at least one flicker region before the at least one flicker region is used as at least one flicker mask, shown as mask magnify in FIG. 17. For example, in the dilation, the processor 13 expands an edge of the at least one flicker region by a predetermined number of pixels, e.g., 1 to 3 pixels, such that the determined flicker mask(s) is larger than the corresponding flicker region(s).

It is appreciated that shapes of the flicker region(s) and the flicker mask(s) are not limited to a rectangular shape as shown in FIG. 17.

This de-flicker method of this embodiment especially has a good effect when a field of view of the optical sensor 11 is tilted upward to the ceiling because in that case the processor 13 is generally not able to distinguish the broken line in an image of a longitudinal light section from the flicker image. Since the flicker noise is almost removed from the second differential image frame IF_diff2, the detection accuracy is improved.

In another aspect, bright image frames and dark image frames are acquired according to the operating timing diagram shown in FIG. 4 or FIG. 13B without particular limitations.

In some scenarios, the mobile robot 100 of the present disclosure is used to detect an overhang (e.g., a sofa) use an upper part of a field of view of the optical sensor 11 and to detect an obstacle on the ground (e.g., a carpet, shoes, a stairway) use a lower part of the field of view of the optical sensor 11. The overhang may have different reflectivity from the obstacle on the ground. In order to detect both the overhang and the obstacle on the ground in the same image frame correctly, i.e. without overexposure or underexposure, the present disclosure stairway further provides an mobile robot 100 that captures one image frame using different exposure times, determined according to separate auto exposures.

The mobile robot 100 includes a light source (e.g., preferably at least one of LS21 and LS22 in FIGS. 1A and 1B), an optical sensor 11 and a processor 13. As mentioned above, the light source projects a longitudinal light section toward a moving direction of the mobile robot 100.

Figure 18:
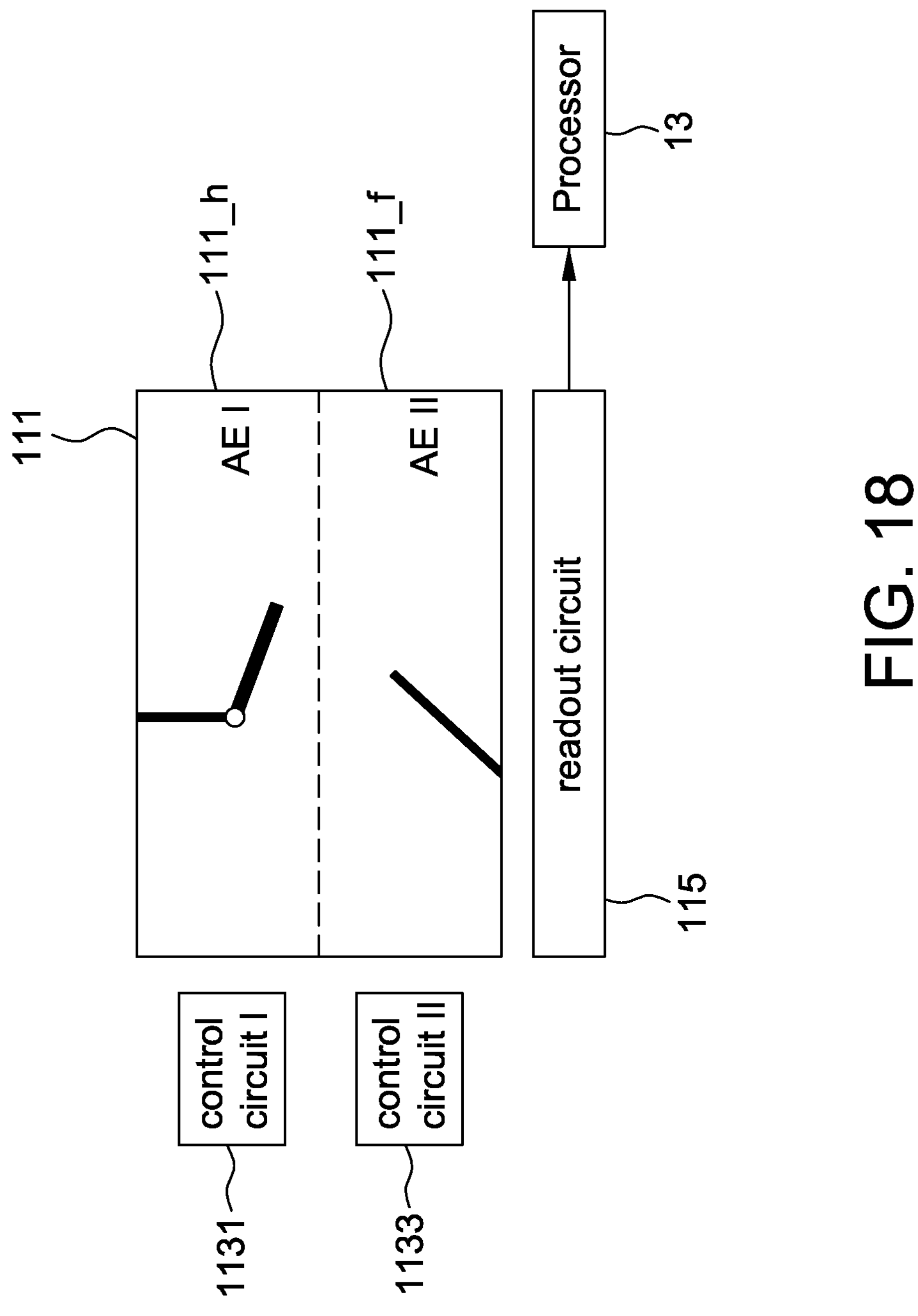
FIG. 18 is a schematic diagram of performing different auto exposures by a mobile robot according to a further embodiment of the present disclosure.

Please refer to FIG. 18, it is a schematic diagram of an optical sensor 11 and an image of the longitudinal light section captured by the optical sensor 11 of the present disclosure. The optical sensor 11 includes a pixel array 111 having multiple pixels arranged in a matrix. The pixel array 111 is divided into an upper part pixels 111_*h* and a lower part pixels 111_*f*, and the pixel array 111 is used to capture an image frame toward the moving direction of the mobile robot 100. It should be mentioned that although FIG. 18 shows that the upper part pixels 111_*h* and a lower part pixels 111_*f* are both a half of the pixel array 111, it is only intended to illustrate but not to limit the present disclosure.

According to the arrangement of the optical sensor 11 (e.g., an angle of a field of view thereof), one of the upper part pixels 111_*h* and the lower part pixels 111_*f* is larger than a half of the pixel array 111 and the other one is smaller than a half of the pixel array 111.

The processor 13 is coupled to the optical sensor 11 as shown in FIG. 1B and FIG. 7. The processor 13 controls the upper part pixels 111_*h* to perform a first auto exposure (e.g., shown as AEI), and controls the lower part pixels 111_*f* to perform a second auto exposure (e.g., shown as AEII) individual from the first auto exposure. The mobile robot 100 includes a first control circuit 1131 and a second control circuit 1133 for controlling operations of the pixel array 111 by sending control signals to switch transistors in the pixel array 111. For example, the processor 13 controls the first control circuit 1131 to output control signals including reset signals, exposure signals and charge transfer signals to the upper part pixels 111_*h* to determine a first exposure time of the upper part pixels 111_*h* based on the first auto exposure AEI, and controls a second control circuit 1133 to output control signals including reset signals, exposure signals and charge transfer signals to the lower part pixels 111_*f* to determine a second exposure time of the lower part pixels 111_*f* based on the second auto exposure AEII. Details of the auto exposure is known to the art (e.g., adjusting exposure time till an average brightness or summation to be within a predetermined range, but not limited to), and thus details thereof are not described herein.

In one aspect, the second exposure time is longer than the first exposure time such that a brighter part of the image of longitudinal light section detected by the upper part pixels 111_*h* is not over-exposed and a darker part of the image of longitudinal light section detected by the lower part pixels 111_*h* is not under-exposed such that detection accuracy is improved.

In one aspect, the first auto exposure AEI and the second auto exposure AEII are performed simultaneously, and pixel data of the upper part pixels 111_*h* and the lower part pixels 111_*f* are read by a same readout circuit 115.

This exposure technique can be applied to acquiring bright image frames (i.e. linear light source turning on) in FIGS. 4, 13A-13B and 15.

Because the hangover is not always existing during operation of the mobile robot 100, in one aspect the processor 13 is arranged to control the upper part pixels 111_*h* and the lower part pixels 111_*f* of the pixel array 111 to perform the same auto exposure upon identifying that an image of the longitudinal light section does not appear in the upper part pixels 111_*h*, e.g., no pixel having a gray level larger than or equal to a predetermined threshold, and is arranged to control the upper part pixels 111_*h* and the lower part pixels 111_*f* of the pixel array 111 to perform different auto exposures (e.g., AEI and AEII shown in FIG. 18) upon identifying that an image of the longitudinal light section appears in the upper part pixels 111_*h*, e.g., a predetermined number of pixels having gray levels larger than or equal to the predetermined threshold.

This aspect is also adaptable to an mobile robot 100 having a light source LS1 and/or LS3.

In some scenarios, the mobile robot 100 is required to generate a three-dimensional (3D) depth map in front of a moving direction of the mobile robot 100. However, current 3D imaging techniques such as the stereo camera, time-of-flight (TOF) camera and structured-lighting camera have high cost. Therefore, the present disclosure further provides a mobile robot 100 that can generate a 3D depth map using a low cost option.

The mobile robot 100 in FIGS. 1A and 1B is also used to generate a 3D depth map. That is, the mobile robot 100 includes a light source that projects a linear light section (including at least one of a transverse light section and a longitudinal light section) of infrared light toward a moving direction of the mobile robot 100.

Figure 19:
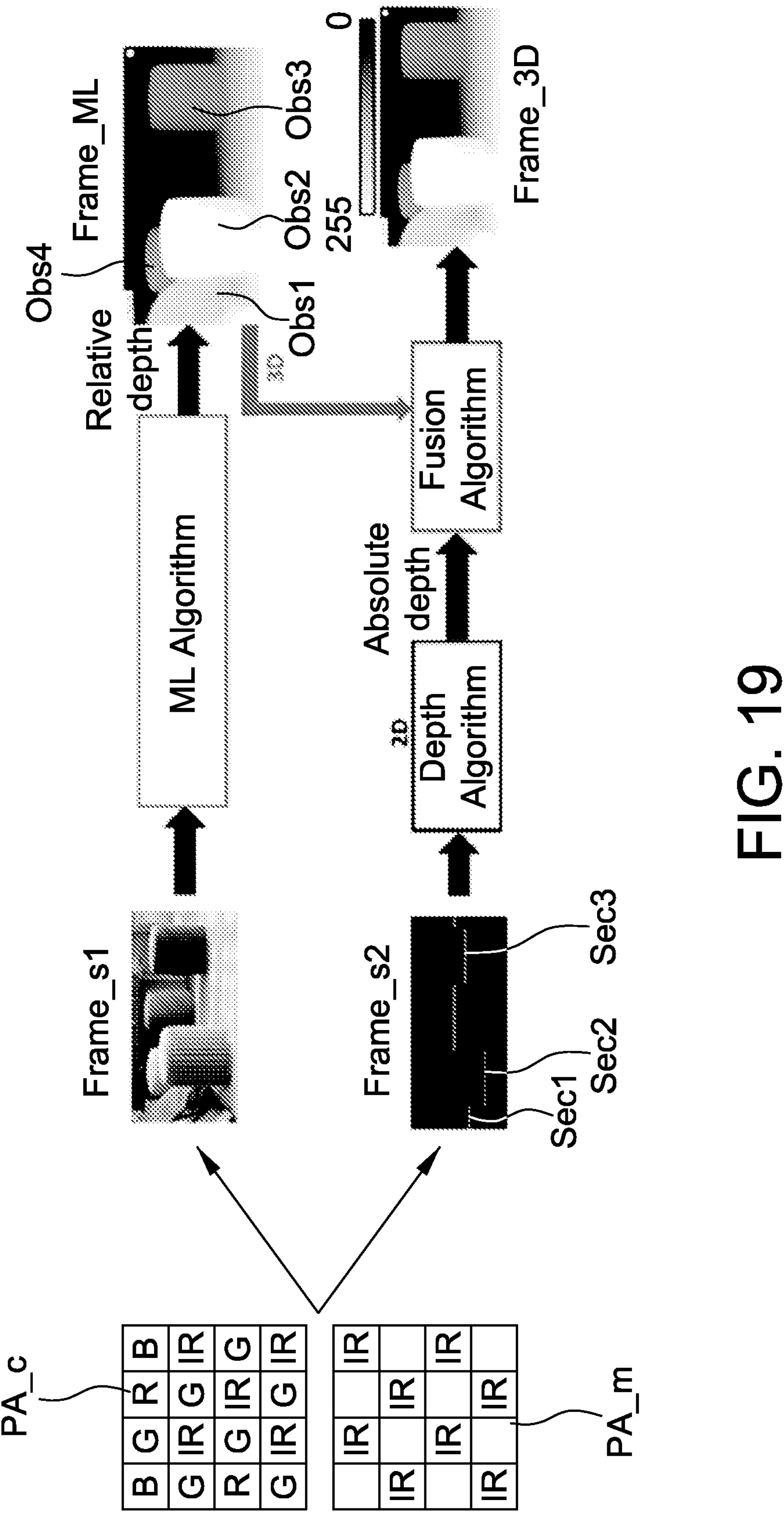
FIG. 19 is a schematic diagram of constructing a 3D depth map by a mobile robot according to a further embodiment of the present disclosure.

Referring to FIG. 19, it is a schematic diagram of generating a 3D depth map by the mobile robot 100 according to one embodiment of the present disclosure. The optical sensor 11 includes a plurality of infrared pixels (e.g., pixels indicated by IR) and a plurality of non-infrared pixels (e.g., pixels indicated by R B and G in a pixel array PA_c or blank regions in a pixel array PA_m, which is similar to FIG. 3). For example, the plurality of non-infrared pixels are monochrome pixels (e.g., detecting visible light) or color pixels (e.g., detecting specific color of light such as red, green and blue, but not limited to) as shown in FIG. 19. In one aspect, the plurality of infrared pixels and the plurality of non-infrared pixels are arranged in a chessboard pattern, but not limited to. It is possible to arrange the plurality of infrared pixels and the plurality of non-infrared pixels similar to FIG. 11A by changing the dual pixels $P_{dual}$ to IR pixels. As mentioned above, the optical sensor 11 is used to capture an image frame toward a moving direction of the mobile robot 100.

In this embodiment, in addition to an algorithm for performing range estimation according to an image of linear light section (e.g., as shown in FIGS. 6A and 6B), the processor 13 is further embedded with a machine learning algorithm (e.g., implemented by software, firmware and/or hardware) for calculating relative depths of obstacle images in an image frame. The machine learning algorithm is, for example, an engine of deep network with pixel-wise prediction, and thus the machine learning algorithm is also called artificial intelligence (AI) algorithm. The machine learning algorithm is not particularly limited as long as it is able to obtain relative depths between obstacle images.

After receiving an image frame from the optical sensor 11, the processor 13 firstly divides the image frame into a first sub-frame (e.g., shown as Frame_s1 in FIG. 19), which is associated with the plurality of non-infrared pixels, and a second sub-frame (e.g., shown as Frame_s2 in FIG. 19), which is associated with the plurality of infrared pixels. In one aspect, the first sub-frame Frame_s1 is used to perform obstacle recognition or VSLAM mentioned above.

Then, the processor 13 calculates, using the machine learning algorithm (e.g., shown as ML Algorithm for abbreviation), relative depths of obstacles in the first sub-frame Frame_s1 to generate a predicted image Frame_ML shown in FIG. 19. For example, the machine learning algorithm indicates each pixel in the first sub-frame Frame_s1 by one gray level. And a difference between gray levels of different obstacles (e.g., shown as Obs1 to Obs4 in FIG. 19) indicates a relative depth mentioned herein.

Meanwhile, the processor 13 calculates, e.g., using the range estimation algorithm therein, absolute depths of obstacles in the second sub-frame Frame_s2. For example, the second sub-frame Frame_s2 is shown to contain broken lines including Sec1, Sec2 and Sec3. As mentioned above, the processor 13 is previously embedded with a lookup table or an algorithm that determines a distance (i.e. called an absolute depth herein) of Sec1, Sec2 and Sec3 respectively according to a height (or longitudinal position) in the second sub-frame Frame_s2. If the linear light section is a longitudinal light section, a distance (i.e. called an absolute depth herein) of an obstacle is determined according to a position of a broken line, which has been illustrated above and thus details thereof are not repeated herein.

To improve the resolution of the first sub-frame Frame_s1 and the second sub-frame Frame_s2, in one aspect the processor 13 further performs interpolation on the first sub-frame Frame_s1 and the second sub-frame Frame_s2 before calculating the relative depths and the absolute depths. Preferably, after the interpolation the interpolated first sub-frame and the interpolated second sub-frame have an identical size.

After the relative depths and the absolute depths are obtained respectively according to the first sub-frame Frame_s1 and the second sub-frame Frame_s2, the processor 13 constructs a 3D depth map by modifying each of the relative depths (or gray level) using a corresponding absolute depth among the calculated absolute depths.

For example, the processor 13 gives each gray level (e.g., shown 0-255 in FIG. 19) in the predicted image Frame_ML by one absolute depth at a corresponding position (e.g., transverse position) in the second sub-frame Frame_s2. For example, the processor 13 gives an obstacle distance (i.e. absolute depth) calculated according the linear section image Sec1 to a gray level corresponding to an obstacle image Obs1; gives an obstacle distance calculated according the linear section image Sec2 to a gray level corresponding to an obstacle image Obs2; gives an obstacle distance calculated according the linear section image Sec3 to a gray level corresponding to an obstacle image Obs3; and so on. In this way, each of obstacle images in the predicted image Frame_ML (calculated from Frame_s1 using the ML algorithm) is given an absolute depth to form a 3D depth map, e.g. shown as Frame_3D.

If the field of view of the optical sensor 11 has two obstacles at a line in the predicted image Frame_ML, e.g., Obs2 and Obs4, the obstacle image Obs4 has no corresponding absolute depth in the second sub-frame Frame_s2 because the second sub-frame Frame_s2 only contains linear light section at the closest obstacle, i.e. the linear light section not able to be projected on an obstacle behind another obstacle. Therefore, there are some obstacles in the predicted image Frame_ML not able to get absolute depths by comparing with (e.g., using a fusion engine) the second sub-frame Frame_s2.

Accordingly, the processor 13 further calculates an interpolated absolute depth to the rest gray level that has no corresponding absolute depth in the second sub-frame Frame_s2. For example, the absolute depth of the obstacle image Obs4 is calculated according to the given absolute depth of the obstacle image Obs1 (or Obs2) and the given absolute depth of the obstacle image Obs3 when the gray level of the obstacle image Obs4 is between the gray levels of the obstacle images Obs1 (or Obs2) and Obs3. After the interpolation, each obstacle image is given by an absolute value (either mapped from the second sub-frame Frame_s2 or calculated by the interpolation) and thus the processor 13 finally outputs a 3D depth map (i.e., Frame_3D) to a downstream device, e.g., the MCU (e.g., the external processor 17 shown in FIG. 13) of the mobile robot 100 for the corresponding controls. In another aspect, the processor 13 of the optical sensor 11 sends Frame_s1 to the external processor 17 to run the ML algorithm and the fusion algorithm, and the processor 13 runs the depth algorithm to output absolute depths to the external processor 17 if the external processor 17 has higher computing ability. That is, the ML algorithm, the Depth algorithm and the Fusion algorithm shown in FIG. 19 are not limited to be executed by the same processor.

In another aspect, a pixel array of the optical sensor 11 is arranged as FIG. 11A with dual pixels $P_{dual}$ and monochrome pixels $P_{dual}$, and the mobile robot 100 operates using that shown in FIG. 13A. The processor 13 takes pixel data generated by the dual pixels $P_{dual}$ as the second sub-frame, and takes pixel data generated by the monochrome pixels $P_{mono}$ and the dual pixels $P_{dual}$ as the first sub-frame to calculate absolute depths and relative depths, respectively. That is, the infrared pixels and the non-infrared pixels in this embodiment is not limited to be arranged in a chessboard pattern, and in this aspect the interpolations on the first sub-frame and the second sub-frame are no longer necessary to be performed before calculating the relative depths and the absolute depths.

In the present disclosure, the second sub-frame Frame_s2 has high distance accuracy but with low image resolution, and the predict image Frame_ML has low distance accuracy but with high image resolution. By fusing the absolute depths of the second sub-frame Frame_s2 into the predict image Frame_ML, it is able to obtain a 3D depth map with high distance accuracy and high image resolution using low cost.

In one aspect, the optical sensor 11, the light sources LS1, LS21, LS22, (LS3 if included) and the processor 13 are formed as a chip or an optical module.

In addition, a number of first light source, the second light source and the third light source is not limited to those shown in FIG. 1A. The first light source, the second light source and the third light source may respectively include multiple light sources to turn on and off simultaneously.

In the present disclosure, the "transverse" is referred to substantially parallel to a moving surface (e.g., the ground), and the "longitudinal" is referred to substantially perpendicular to the moving surface. The object on the moving path is called the obstacle.

As mentioned above, the conventional cleaning robot adopts multiple types of sensors to respectively implement different detecting functions, and has the issues of high computation loading, time and consumption power as well as low recognition correctness. Accordingly, the present disclosure further provides a mobile robot suitable to recognize objects or obstacles using an AI engine supporting a fixed image frame (e.g. FIG. 9). The present disclosure further provides a mobile robot incorporating a dual-bandpass filter.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A mobile robot, comprising:

a light source, configured to project a linear light section of infrared light toward a moving direction of the mobile robot;

an optical sensor, comprising a plurality of infrared pixels and a plurality of non-infrared pixels, and configured to capture an image frame toward the moving direction; and a processor, embedded with a machine learning algorithm and coupled to the optical sensor, and configured to divide the image frame into a first sub-frame, associated with the plurality of non-infrared pixels, and a second sub-frame, associated with the plurality of infrared pixels, calculate, using the machine learning algorithm, relative depths of obstacles in the first sub-frame, calculate absolute depths of the obstacles in the second sub-frame, and construct a three-dimensional depth map by modifying each of the relative depths using a corresponding absolute depth among the calculated absolute depths.

2. The mobile robot as claimed in claim 1, wherein the plurality of non-infrared pixels are monochrome pixels or color pixels.

3. The mobile robot as claimed in claim 1, wherein the plurality of infrared pixels and the plurality of non-infrared pixels are arranged in a chessboard pattern.

4. The mobile robot as claimed in claim 1, wherein the processor is further configured to perform interpolation on the first sub-frame and the second sub-frame before calculating the relative depths and the absolute depths.

5. The mobile robot as claimed in claim 1, wherein the machine learning algorithm is configured to indicate each of the relative depths in the first sub-frame by one gray level.

6. The mobile robot as claimed in claim 5, wherein the processor is configured to give each gray level in the first sub-frame by one absolute depth at a corresponding position in the second sub-frame.

7. The mobile robot as claimed in claim 6, wherein the processor is further configured to calculate an interpolated absolute depth to the rest gray level that has no corresponding absolute depth in the second sub-frame.

8. The mobile robot as claimed in claim 1, wherein the linear light section is a transverse light section or a longitudinal light section.

9. A mobile robot, comprising:

a light source, configured to project a longitudinal light section toward a moving direction of the mobile robot, and the light source being turned on and turned off alternatively;

an optical sensor, configured to sequentially capture a first dark image frame, a bright image frame and a second dark image frame toward the moving direction; and a processor, coupled to the optical sensor, and configured to calculate a first differential image frame between the first dark image frame and the second dark image frame to determine at least one flicker region, calculate a second differential image frame between the bright image frame and one of the first dark image frame and the second dark image frame, and use the at least one flicker region as at least one flicker mask in the second differential image frame.

10. The mobile robot as claimed in claim 9, wherein the processor is further configured to perform dilation on the at least one flicker region before the at least one flicker region is used as the at least one flicker mask in the second differential image frame.

11. The mobile robot as claimed in claim 10, wherein in the dilation, the processor is configured to expand an edge of the at least one flicker region by a predetermined number of pixels.

12. The mobile robot as claimed in claim 9, wherein the processor is further configured to perform range estimation using the second differential image frame with the at least one flicker mask therein.

13. The mobile robot as claimed in claim 12, wherein in the range estimation, pixel data within the at least one flicker mask is ignored.

14. The mobile robot as claimed in claim 9, wherein a field of view of the optical sensor is tilted upward in the moving direction.

15. A mobile robot, comprising:

a light source, configured to project a longitudinal light section toward a moving direction of the mobile robot;

an optical sensor, comprising a pixel array divided into an upper part pixels and a lower part pixels, and the pixel array being configured to capture an image frame toward the moving direction; and a processor, coupled to the optical sensor, and configured to control the upper part pixels to perform a first auto exposure, and control the lower part pixels to perform a second auto exposure individual from the first auto exposure.

16. The mobile robot as claimed in claim 15, wherein the first auto exposure is configured to determine a first exposure time of the upper part pixels, and the second auto exposure is configured to determine a second exposure time, which is longer than the first exposure time, of the lower part pixels.

17. The mobile robot as claimed in claim 15, wherein the first auto exposure of the upper part pixels is controlled by a first control circuit, the second auto exposure of the lower part pixels is controlled by a second control circuit, and pixel data of the upper part pixels and the lower part pixels are read by a same readout circuit.

18. The mobile robot as claimed in claim 15, wherein the processor is further configured to control the upper part pixels and the lower part pixels of the pixel array to perform the same auto exposure upon identifying that an image of the longitudinal light section does not appear in the upper part pixels.

19. The mobile robot as claimed in claim 15, wherein the processor is further configured to control the upper part pixels and the lower part pixels of the pixel array to perform different auto exposures upon identifying that an image of the longitudinal light section appears in the upper part pixels.

20. The mobile robot as claimed in claim 15, wherein the first auto exposure and the second auto exposure are performed simultaneously.

* * * * *